(12) United States Patent
Scott et al.

(10) Patent No.: US 9,964,396 B1
(45) Date of Patent: May 8, 2018

(54) INTEGRATED FOURIER TRANSFORM OPTICAL SPECTROMETER

(71) Applicant: COM DEV LTD., Mississauga (CA)

(72) Inventors: Alan Scott, Arnprior (CA); Hugh Podmore, Toronto (CA)

(73) Assignee: COM DEV LTD., Mississauga (CA)

( * ) Notice: Subject to any disclaimer, the term of this patent is extended or adjusted under 35 U.S.C. 154(b) by 0 days. days.

(21) Appl. No.: 15/343,827

(22) Filed: Nov. 4, 2016

(51) Int. Cl.
*G01B 9/02* (2006.01)
*G01J 3/45* (2006.01)
*G01J 3/453* (2006.01)

(52) U.S. Cl.
CPC ..... *G01B 9/02044* (2013.01); *G01B 9/02027* (2013.01); *G01B 9/02051* (2013.01);
(Continued)

(58) Field of Classification Search
CPC ............ G01B 9/02027; G01B 9/02044; G01B 9/02051; G01B 9/02097; G01J 3/45;
(Continued)

(56) References Cited

U.S. PATENT DOCUMENTS 7,317,535 B2 * 1/2008 Cheben ..................... G01J 3/02 356/326
8,098,379 B2 1/2012 Okamoto
(Continued)

FOREIGN PATENT DOCUMENTS

EP 2 136 191 A1 12/2009
WO 99/18520 A1 4/1999
(Continued)

OTHER PUBLICATIONS

Krzakala, et al., "Statistical-physics-based reconstruction in compressed sensing", Phys. Rev. X 2, 021005, 2012, pp. 1-21.
(Continued)

*Primary Examiner* — Michael A Lyons
(74) *Attorney, Agent, or Firm* — Bereskin & Parr LLP/S.E.N.C.R.L., s.r.l.; Isis E. Caulder; Timothy Cameron Gale

(57) ABSTRACT

A spectrometer and method for determining an emitted light spectrum. An input light signal is received and directed to an array of interferometers using waveguides. A plurality of self-interfering signals are detected from a first plurality of interferometers in the array of interferometers. The first plurality of interferometers has fewer interferometers than required to satisfy the Nyquist criterion for reconstructing the emitted light spectrum. The emitted light spectrum is reconstructed from the plurality of self-interfering signals using compressive sensing. The plurality of self-interfering signals can provide an interference pattern used to reconstruct the emitted light spectrum. A second plurality of interferometers may output a second plurality of self-interfering signals to reconstruct a low resolution spectrum of the input light signal satisfying the Nyquist criterion. Low resolution signal components can be detected from the low resolution spectrum and used to pre-process the interference pattern.

15 Claims, 10 Drawing Sheets

(52) U.S. Cl.
 CPC ............ *G01B 9/02097* (2013.01); *G01J 3/45* (2013.01); *G01J 3/4531* (2013.01)

(58) Field of Classification Search
 CPC ........ G01J 3/453; G01J 3/4531; G01J 3/0218; G01J 3/0272
 See application file for complete search history.

(56) References Cited

U.S. PATENT DOCUMENTS

| | | | |
|---|---|---|---|
| 8,351,043 | B2 | 1/2013 | Cheben et al. |
| 2004/0207855 | A1* | 10/2004 | Brady .................. G01J 3/02 356/451 |
| 2007/0076208 | A1 | 4/2007 | Koo |
| 2016/0066775 | A1 | 3/2016 | Hunter et al. |
| 2016/0282184 | A1* | 9/2016 | Khalil .................. G01J 3/108 |
| 2017/0205337 | A1* | 7/2017 | Akhtman ............. G01N 21/31 |

FOREIGN PATENT DOCUMENTS

| | | |
|---|---|---|
| WO | 2015/199793 A1 | 12/2015 |
| WO | 2016/115321 A3 | 7/2016 |

OTHER PUBLICATIONS

Sturm, et al., "Cyclic Pure Greedy Algorithms for Recovering Compressively Sampled Sparse Signals", Forty Fifth Asilomar Conference on Signals, Systems and Computers (Asilomar), 2011, Asilomar, United States. IEEE Computer Society, pp. 1143-1147.

Florjańczyk, et al., "Multiaperture planar waveguide spectrometer formed by arrayed Mach-Zehnder interferometers", Opt Express, 2007, 15(26): 18176-18189.

Candès, et al., "An Introduction to Compressive Sampling", IEEE Signal Processing Magazine, 2008, 25(2): 21-30.

Lorenz, et al,. "Solving Basis Pursuit: Heuristic Optimality Check and Solver Comparison", ACM Trans. Math. Softw., 2015, 41(2): 1-28.

Qaisar, et al., "Compressive Sensing: From Theory to Applications, a Survey", Journal of Communications and Networks, 2013, 15(5): 443-456.

"Background Filtering in Fiber Optic Raman Sampling Probes", Technical Note #13, InPhotonics, Inc., 1999.

Misra, et al., "Single Pulse Remote Raman Detection of Minerals and Organics Under Illuminated Condition from 10 Meters Distance", Lunar and Planetary Science XXXVI, Part 13, 2005, 2 pages.

Harig, et al., "Remote Detection of Methane by Infrared Spectrometry for Airborne Pipeline Surveillance: First Results of Ground-Based Measurements", Proceedings of SPIE, 2004, 5235: 435-446.

Lamsal, et al., "Remote UV Raman Spectroscopy for Planetary Exploration Using a Miniature Spatial Heterodyne Raman Spectrometer", Proceedings of the 47th Lunar and Planetary Science Conference, Contribution No. 1903, 2016, pp. 1500-1501.

Florjańczyk, et al., "Development of a slab waveguide spatial heterodyne spectrometer for remote sensing", Proceedings of SPIE, 2010, vol. 7594, pp. 75940R-1 to 75940R-9.

Herres, et al., "Understanding FT-IR data processing", Tech. Rep., 2013, 23 pages.

Guha, et al., "Minimizing temperature sensitivity of silicon Mach-Zehnder interferometers", Optics Express, 2010, 18(3): 1879-1887.

Padmaraju, et al., "Resolving the thermal challenges for silicon microring resonator devices", Nanophotonics, 2014, 3(5): 269-281.

Arbabi, et al., "Measurements of the refractive indices and thermo-optic coeffcients of Si3N4 and SiO(x) using microring resonances", Optics Letters, 2013, 38(19): 3878-3881.

Bovington, et al., "Thermal stress implications in athermal TiO2 waveguides on a silicon substrate", Optics Express, 2014, 22(1): 661-666.

Velasco, et al., "High-resolution Fourier-transform spectrometer chip with microphotonic silicon spiral waveguides", Optics Letters, 2013, 38(5): 706-708.

Zhao, et al., "Multichannel FT-Raman Spectroscopy: Noise Analysis and Performance Assessment", Applied Spectroscopy, 1997, 51(11): 1687-1697.

Florjańczyk, et al., "Spatial heterodyne planar waveguide spectrometer: theory and design", Proc. of SPIE, 2008, vol. 7099, pp. 70991L-1 to 70991L-5.

Extended European Search Report dated Mar. 12, 2018 in corresponding EP Patent Application No. 17187351.6.

* cited by examiner

INTEGRATED FOURIER TRANSFORM OPTICAL SPECTROMETER

FIELD

The present subject-matter relates generally to spectrometry, and more particularly to Fourier transform optical spectrometry.

INTRODUCTION

Spectrometry involves the analysis of matter based on its interaction with electromagnetic radiation. Optical spectrometry analyzes the distribution of light across the optical spectrum emitted from a sample or location of interest. For example, a sample of interest may be excited using a pulse of electromagnetic radiation such as a laser light pulse. Light emitted by the sample in response to the excitation pulse can be analyzed to determine the elements present in the sample being analyzed.

Many applications may have use for optical spectrometry. For example, optical spectrometry may be used to analyze soil samples for geological applications or to analyze the composition of pharmaceutical products. Optical spectrometry may also find applications in interstellar and planetary exploration, for instance in detecting organic compound or target minerals.

Depending on the application, there may be limits imposed on the size or weight of a spectrometry device. For example, in some applications it may be desirable to have a handheld device to allow optical spectrometry data to be easily acquired. In some cases, spectrometry devices may be required to detect an emitted spectrum while operating at low power or in low light conditions.

SUMMARY

It would thus be highly desirable to be provided with a device or system that would at least partially address the disadvantages of the existing technologies.

The embodiments described herein provide in an aspect a spectrometer. In some embodiments, the spectrometer may be provided as a spectrometer system. In some embodiments, the spectrometer may be provided as a spectrometer device. In some examples, the spectrometer may be handheld. The spectrometer may include an input aperture. The input aperture can be configured to receive an input light signal. The spectrometer can also include an array of interferometers. Each interferometer can have a signal input and a signal output and can be configured to output a self-interfering signal with a known phase shift. The array of interferometers can include a first plurality of interferometers where the phase shift for each interferometer in the first plurality of interferometers can be different from the phase shift of every other interferometer in the first plurality of interferometers. The spectrometer can also include a plurality of input waveguides optically coupled to the input aperture and to the array of interferometers. The plurality of input waveguides can receive the input light signal from the input aperture. The plurality of input waveguides can also direct the received light signal to the array of interferometers. The spectrometer can include a detector array optically coupled to the array of interferometers to detect a first plurality of self-interfering signals from the first plurality of interferometers. The first plurality of self-interfering signals can include the self-interfering signal output by each of the interferometers in the first plurality of interferometers. The spectrometer can include a computer-readable storage medium coupled to the detector array. The computer-readable storage medium can be configured to store at least one first interferometric output signal based on the first plurality of self-interfering signal detected by the detector array. The number of interferometers in the first plurality of interferometers can be fewer than the number of interferogram samples required to satisfy the Nyquist criterion for reconstructing an emitted light spectrum with a spectral bandwidth B and a spectral resolution $\Delta\lambda$. The interferogram samples required to satisfy the Nyquist criterion for the spectral bandwidth B and spectral resolution $\Delta\lambda$ may correspond to a first plurality of Nyquist phase shifts, and for each interferometer in the first plurality of interferometers the phase shift can be selected from the first plurality of Nyquist phase shifts to permit reconstruction of the emitted light spectrum with the spectral bandwidth B and the spectral resolution $\Delta\lambda$ from the stored at least one first interferometric output signal using compressive sensing.

In some examples, the spectrometer may also include a processor coupled to the computer-readable storage medium. The processor may be configured to determine a discrete interference pattern from the first plurality of self-interfering signals detected by the detector array. The processor can also be configured to reconstruct the emitted light spectrum from the discrete interference pattern. The processor may reconstruct the emitted light spectrum from the discrete interference pattern by determining a plurality of potential emitted spectra; determining a distance value for each of the potential emitted spectra based on the discrete interference pattern and defined signal acquisition parameters of the spectrometer; identifying a lowest distance potential emitted spectrum as the potential emitted spectrum from the plurality of potential emitted spectra that corresponds to the lowest distance value; and reconstructing the emitted light spectrum as the lowest distance potential emitted spectrum.

In some examples, the processor may be configured to reconstruct the emitted light spectrum using a pre-processed discrete interference pattern. The processor may be configured to reconstruct the emitted light spectrum by identifying low-resolution spectral signal components in the discrete interference pattern; generating a pre-processed discrete interference pattern by removing the low-resolution spectral signal components from the discrete interference pattern; and reconstructing the emitted light spectrum from the discrete interference pattern using the pre-processed discrete interference pattern.

In some examples, the array of interferometers may include a second plurality of interferometers. The second plurality of interferometers can include fewer interferometers than the first plurality of interferometers. The detector array can be optically coupled to the array of interferometers to detect a second plurality of self-interfering signals from the second plurality of interferometers. The second plurality of self-interfering signals may include the self-interfering signal output by each of the interferometers in the second plurality of interferometers. The computer-readable storage medium may be further configured to store at least one low resolution interferometric output signal based on the second plurality of self-interfering signals. The number of interferometers in the second plurality of interferometers may be not less than the number of interferogram samples required to satisfy the Nyquist criterion for reconstructing a low resolution spectrum of the input light signal. The low resolution spectrum can have the spectral bandwidth B and a spectral resolution of $\Delta\lambda_{low}$ where $\Delta\lambda_{low} > 2\Delta\lambda$. The interferogram samples required to satisfy the Nyquist criterion for the spectral bandwidth B and the spectral resolution of $\Delta\lambda_{low}$ may correspond to a second plurality of Nyquist phase shifts and the phase shifts of the interferometers in the second plurality of interferometers can be selected to correspond to the second plurality of Nyquist phase shifts.

In some examples, a processor may be coupled to the computer-readable storage medium. The processor may be configured to determine a discrete interference pattern from the first plurality of self-interfering signals detected by the detector array. The processor may be configured to determine a low resolution spectrum of the input light signal from the second plurality of self-interfering signals detected by the detector array. The processor may be configured to identify low-resolution spectral signal components from the low resolution spectrum. The processor may be configured to generate a pre-processed discrete interference pattern by removing the low-resolution spectral signal components from the discrete interference pattern. The processor may be configured to reconstruct the emitted light spectrum from the pre-processed discrete interference pattern.

In some examples, the processor may be configured to reconstruct the emitted light spectrum from the pre-processed discrete interference pattern by determining a plurality of potential emitted spectra; determining a distance value for each of the potential emitted spectra based on the pre-processed discrete interference pattern and defined signal acquisition parameters of the spectrometer; identifying a lowest distance potential emitted spectrum as the potential emitted spectrum from the plurality of potential emitted spectra that corresponds to the lowest distance value; and reconstruct the emitted light spectrum as the lowest distance potential emitted spectrum.

In some examples, the phase shifts for the first plurality of interferometers can be selected randomly from the first plurality of Nyquist phase shifts. The phase shifts for the first plurality of interferometers may be selected as a set of phase shifts from the first plurality of Nyquist phase shifts that satisfy the restricted isometry principle.

In some examples, the optical coupling between the input aperture and the plurality of input waveguides may include a mirror array having a plurality of mirrors. Each of the input waveguides may have a corresponding mirror in the mirror array. For each input waveguide, the corresponding mirror can be angled to direct a portion of the input light signal from the input aperture along that input waveguide.

In some examples, the spectrometer may include a planar spectrometer surface. Each of the input waveguides may be a substantially planar waveguide on the spectrometer surface. Each mirror in the mirror array can be mounted on the spectrometer surface and angled to direct the portion of the input light signal that is incident on the mirror at the spectrometer surface along the corresponding input waveguide.

In some examples, the input aperture may include a plurality of lenses. The plurality of lenses may include a lens corresponding to each of the mirrors in the mirror array. Each lens may be focused to direct a portion of the input light signal to the corresponding mirror.

In some examples, the array of interferometers and the plurality of input waveguides may be provided on a single chip. The array of interferometers and the plurality of input waveguides may be etched onto the chip.

In some examples, the number of interferometers in the array of interferometers may be less than or equal to half the number of interferogram samples required to satisfy the Nyquist criterion. In some examples, the number of interferometers in the first plurality of interferometers may be less than or equal to ¼ the number of interferogram samples required to satisfy the Nyquist criterion.

In some examples, the spectrometer may include a light source. The light source may be configured to transmit a source light signal with a known wavelength towards a location of interest. The input light signal may be a scattered light signal received from the location of interest. In some examples, the spectrometer may also include a processor coupled to the computer-readable storage medium. The processor may be configured to identify a source spectral component from the received input light signal; determine at least one correction factor based on the identified source spectral component and the known wavelength of the light source; and adjust the reconstructed spectrum of the input light signal based on the at least one correction factor.

The embodiments described herein provide in another aspect a method for determining an emitted light spectrum. The emitted light spectrum may have a spectral bandwidth B and a spectral resolution $\Delta\lambda$. The method may include receiving an input light signal. The method may also include directing the input light signal to an array of interferometers. The method may also include concurrently detecting a first plurality of self-interfering signals from a first plurality of interferometers in the array of interferometers. The number of self-interfering signals in the first plurality of self-interfering signals can be fewer than the number of samples required to satisfy the Nyquist criterion to reconstruct the emitted light spectrum. The method may also include reconstructing the emitted light spectrum from the plurality of self-interfering signals using compressive sensing.

In some examples, reconstructing the emitted light spectrum may include determining a discrete interference pattern from the first plurality of self-interfering signals; determining a plurality of potential emitted spectra; determining a distance value for each of the potential emitted spectra based on the discrete interference pattern and defined signal acquisition parameters of the spectrometer; identifying a lowest distance potential emitted spectrum as the potential emitted spectrum from the plurality of potential emitted spectra that corresponds to the lowest distance value; and reconstructing the emitted light spectrum as the lowest distance potential emitted spectrum.

In some examples, the emitted light spectrum may be reconstructed using a pre-processed discrete interference pattern. In some examples, the method may include generating a pre-processed discrete interference pattern by removing low-resolution spectral signal components from the discrete interference pattern; and reconstructing the emitted light spectrum using the pre-processed discrete interference pattern.

In some examples, the method may include concurrently detecting a second plurality of self-interfering signals from a second plurality of interferometers in the array of interferometers. The method may also include determining a low resolution spectrum of the input light signal with the spectral bandwidth B and a spectral resolution of $\Delta\lambda_{low}$ where $\Delta\lambda_{low} > 2\Delta\lambda$ from the second plurality of self-interfering signals using a Fourier transform. The number of self-interfering signals in the second plurality of self-interfering signals may be not less than the number of interferogram samples required to satisfy the Nyquist criterion for reconstructing the low resolution spectrum. The method may also include identifying the low-resolution spectral signal components from the low resolution spectrum.

In some examples, the method may include identifying a source spectral component from the input light signal. The source spectral component may correspond to a light source having a known wavelength. The method may also include determining at least one correction factor based on the identified source spectral component and the known wavelength. The method may further include adjusting the reconstructed spectrum of the input light signal using the at least one correction factor.

In some examples, the number of self-interfering signals in the first plurality of self-interfering signals is less than or equal to half the number of samples required to satisfy the Nyquist criterion for the spectrum of the input light signal. In some examples, the number of self-interfering signals in the first plurality of self-interfering signals is less than or equal to ¼ the number of samples required to satisfy the Nyquist criterion for the spectrum of the input light signal.

It will be appreciated by a person skilled in the art that a spectrometer may include any one or more of the features contained herein and that the features may be used in any particular combination or sub-combination suitable for a spectrometry device, system and/or method.

DRAWINGS

For a better understanding of the embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

Figure 1:
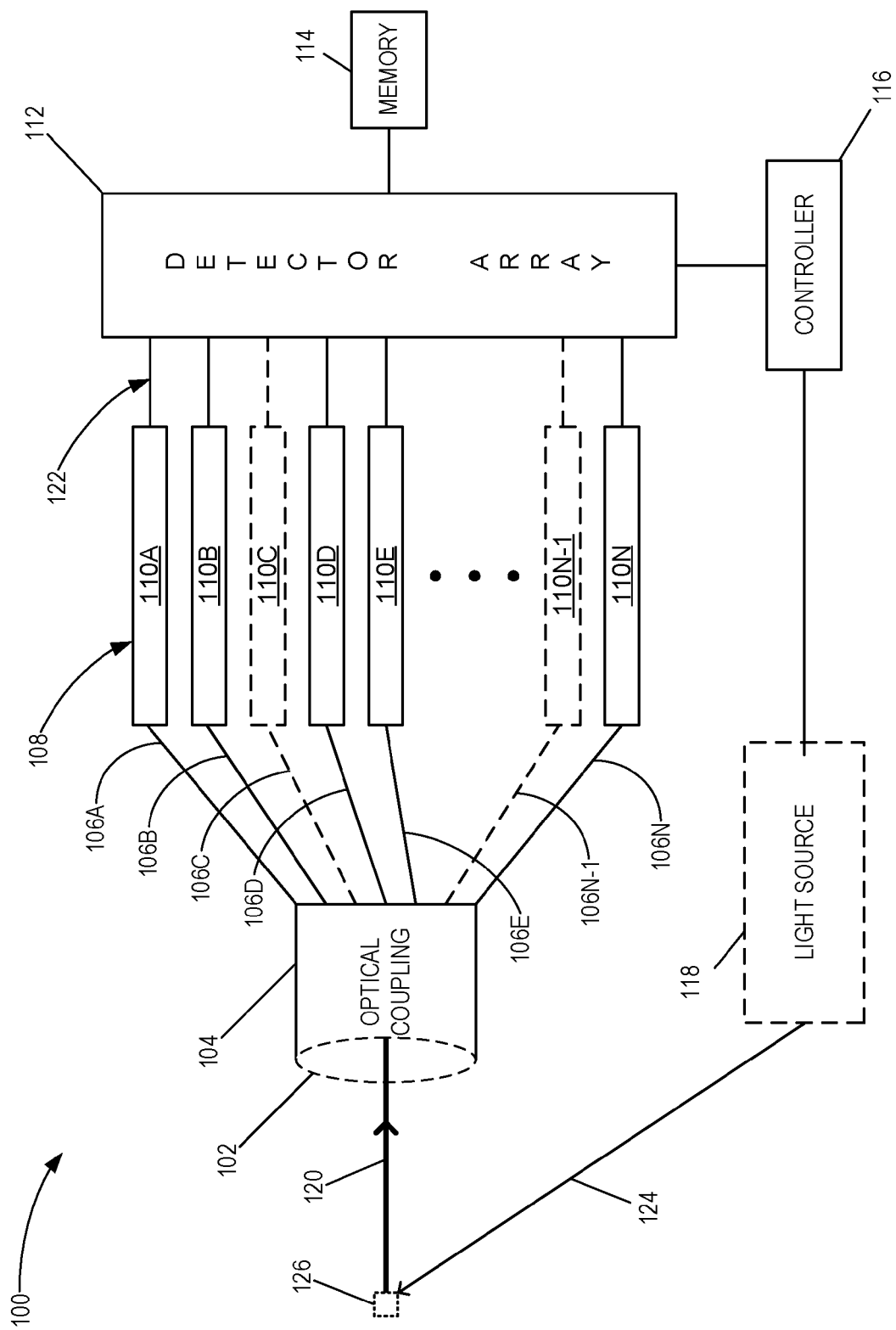
FIG. 1 illustrates an example of a spectrometer in accordance with an example embodiment.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems, devices and methods of the embodiments described herein may be capable of being distributed in a computer program product comprising a computer readable medium that bears computer usable instructions for one or more processors. The medium may be provided in various forms, including non-transitory forms such as, but not limited to, flash drives, one or more diskettes, compact disks, tapes, and magnetic and electronic storage.

The embodiments described herein relate generally to spectrometry. In particular, some embodiments described herein may provide a spectrometry system that can be used to determine an emitted light spectrum from an input light signal. Embodiments may also provide a spectrometry device that can be used to determine an emitted light spectrum from an input light signal. Some embodiments described herein may also provide spectrometry methods for determining an emitted light spectrum from an input light signal. In general, the various systems, devices, and methods described in embodiments herein may be combined as part of a combined spectrometry system or spectrometry device.

In many spectrometry applications size and mass play an important role. Smaller and lighter spectrometers may be desirable for applications in distributed sensor networks, such as constellations of earth-observation (EO) satellites, or as part of a pipeline-health monitoring network. Handheld spectrometry devices, such as devices that may be used for geological or pharmaceutical purposes, can introduce size and/or weight limitations. Spectrometry devices for space and planetary exploration (e.g. planetary rovers) may involve highly constrained mass and size/volume budgets. Accordingly, spectrometry devices that may have reduced size and/or weight may be desirable.

Spectrometry devices may be required to determine the spectrum of an emitted light signal while operating at low power levels or with low light intensity signals. In some cases, a sample being interrogated may be small and may not allow for multiple repeated excitations. Increasing the level of light measured in each sample of an input light signal can improve the signal to noise ratio of the measured samples.

An increase in signal to noise ratio may provide more accurate spectrometry devices. Accuracy may be particularly important in applications such as security (e.g. bomb compound detection) to ensure that potentially volatile samples are correctly identified.

High-speed detection can also be important in spectrometry application. In general, high speed detection may allow samples of more input light signals to be acquired and analyzed in a period of time. In some applications it may be particularly important that the spectrum be identified quickly, e.g. in security applications so that security procedures can be implemented if necessary (e.g. if a bomb is detected).

Embodiments described herein may provide examples of Fourier transform spectrometers, Fourier transform spectrometer systems, and Fourier transform spectrometer methods. Fourier transform spectrometry involves the collection of spectra by measuring coherence of a radiation source. A plurality of samples of the electromagnetic radiation can be acquired from a radiation source. The intensity of each sample can be detected and the plurality of samples combined to provide an interferogram.

Embodiments described herein may use an array of interferometers. The interferometers in the array may have wavelength-dependent transmission characteristics. This may permit an output spatial light distribution pattern or interference pattern to be generated. A spectrum of light emitted from the radiation source of interest may be reconstructed based on this distribution pattern or interference pattern.

An interferogram may be collected point-by-point over time using a single interferometer, or a few interferometers with temporally varying phase shifts. An interferogram or interference pattern may also be measured substantially instantaneously using spatially distributed or physically separated interferometers with different phase shifts.

A plurality of interferometers may be spatially distributed or arrayed. This may allow the plurality of interferometric samples to be captured substantially simultaneously/concurrently. This configuration may also provide mechanical robustness as the plurality of samples may be acquired without moving parts. For example, the interferometers may be arrayed on the surface of a planar photonic chip or optical waveguide chip. In some examples, the array of interferometers may include an array of spliced fiber optic cables.

Each interferometer can be configured to output a self-interfering signal with a known phase shift. The array of interferometers may include a first plurality of interferometers where the phase shift for each interferometer is different from the phase shift of every other interferometer in the first plurality of interferometers. The phase shifts of the interferometers in the first plurality of interferometers may increase with each subsequent interferometer. In some embodiments, the phase shifts may increase linearly, while in other embodiments this may not be the case.

An input light signal can be coupled to the array of interferometers using an input aperture. The input aperture can direct the input light signal towards a plurality of waveguides e.g. using optical couplings. The plurality of waveguides can be optically coupled to the input aperture and to the array of interferometers. The waveguides can receive the input light signal from the input aperture. The waveguides may then direct the received light signal to the array of interferometers.

The plurality of waveguides may define a waveguide section of the spectrometer. The waveguide section may include an input waveguide region coupled to the aperture. The input waveguide region may include a plurality of input waveguides defining input waveguide paths. The plurality of input waveguides may provide optical coupling between the input aperture and the array of interferometers. In some cases, the array of interferometers may be defined as an interferometer region of the waveguide section. That is, the interferometers may be provided using waveguides in the waveguide section.

The plurality of self-interfering signals output by the interferometers can be detected using a detector array. The detector array may be positioned to span the spatial distribution of the interferometer signal outputs. This may allow for rapid collection of samples required to reconstruct an emitted signal spectrum. In some cases, all the samples required to reconstruct the emitted signal spectrum may be acquired substantially instantaneously.

The plurality of self-interfering signals detected by the detector array can be used to generate a discrete interference pattern. The discrete interference pattern may then be used to reconstruct the emitted signal spectrum. In some cases, the spectrometer device may include an on-board controller or processor that can be configured to reconstruct the emitted signal spectrum.

In some cases, the reconstruction of the emitted signal spectrum may be performed remotely. For example, the spectrometer device may include on-board memory that can be used to store at least one interferometric output signal such as the plurality of self-interfering signals and/or the discrete interference pattern. The interferometric output signal(s) may be transmitted to a remote processor to allow the emitted signal spectrum to be reconstructed. In some cases, interferometric output signals for a plurality of radiation sources/targets/samples may be acquired and stored in the on-board memory for subsequent processing.

In some embodiments described herein, the array of interferometers may include Mach-Zehnder interferometers (MZIs). In some embodiments described herein the interferometers may include Fabry-Perot interferometers.

In embodiments using MZIs, each interferometer generally includes a reference arm or first signal path and a delay arm or second signal path. The phase shift for each interferometer may be defined by an optical path delay (OPD) between the first arm (i.e. first signal path) of an interferometer and the second arm (i.e. second signal path) of that interferometer. Each interferometer in the first plurality of interferometers may be configured to have a different optical path delay. In some cases, the length of the first signal path may be fixed across all interferometers, while the length of the second signal path can be varied between interferometers.

As mentioned, the array of interferometers may be implemented using waveguides, e.g. as an interferometer region of a waveguide section. For instance, where MZIs are used, each of the waveguides may split in the interferometer region of the waveguide section to define a first signal path and second signal path for the corresponding interferometer.

The array of interferometers can be used to generate a plurality of self-interfering signal outputs. For example, the signals from the delay and reference arms (i.e. from the first signal path and the second signal path) of an interferometer can be recombined to provide a self-interfering signal at the signal output of that interferometer. The plurality of self-interfering signals from the signal outputs of the array of interferometers can be detected using a detector array optically coupled to the array of interferometers. The detector array may detect the self-interfering signals from the signal output of each of the interferometers substantially simultaneously.

The plurality of self-interfering signals may be considered analogous to discrete samples of the input light signal. For a waveguide implemented MZI the self-interfering signal output from the $i^{th}$ interferometer, F(i), may correspond to a single coefficient of a cosine transformation given by $$F(i)=\int_{\bar{\sigma}_{min}}^{\bar{\sigma}_{max}} p^{in}(\bar{\sigma})\cos(2\pi\bar{\sigma}n_{eff}L_i)d\bar{\sigma} \quad (1)$$

or by the discrete cosine transformation (DCT)

$$F(i)=\delta\bar{\sigma}\Sigma_{k=1}^{\Delta\bar{\sigma}/\delta\bar{\sigma}} p^{in}(k\cdot\delta\bar{\sigma})\cos(2\pi(k\cdot\delta\bar{\sigma})n_{eff}L_i) \quad (2)$$

where $\bar{\sigma}$ is a shifted wavenumber ($\bar{\sigma}=\sigma-\sigma_{min}$) which may be used to replace an un-shifted wavenumber ($\sigma$) provided that low-frequency components (i.e. wavenumbers $\sigma<\sigma_{min}$) have been eliminated, e.g. using an aliasing filter; $\sigma_{min}$ corresponds to a cutoff frequency at low wavenumbers, and $\sigma_{max}$ corresponds to a high-frequency cutoff; the OPD of the $i^{th}$ interferometer is represented by OPD=$n_{eff}L_i$ where $n_{eff}$ represents the effective index of a waveguide used to implement the MZI and $L_i$ represents the difference in path length between the MZI arms; $p^{in}(\bar{\sigma})$ represents the intensity of the input spectra in terms of shifted wavenumber; and the incrementing number k and wavenumber resolution $\sigma_i$ are used to iterate over the input spectrum in the DCT.

Typically, to reconstruct an emitted light spectrum, the Nyquist criterion (i.e. Nyquist-Shannon sampling theorem) is used to determine the number of samples of the input light signal that are required, i.e. the number of interferometers required. The Nyquist criterion can also be used to determine the phase shift for each of the interferometers. For example, the Nyquist criterion can be used to define the number of MZIs and the optical path length differences required to sample a particular spectrum. Given a maximum desired wavenumber $\sigma_{max}$, a minimum desired wavenumber $\sigma_{min}$, and a desired wavenumber resolution $\delta\sigma$ the minimum number of sampling points ($N_{min}$) required to reconstruct an emitted spectrum from an input light signal according to the Nyquist criterion can be determined by $$N_{min}=2\frac{\sigma_{max}-\sigma_{min}}{\delta\sigma} \quad (3)$$

Equation (3) establishes the minimum number of sampling points ($N_{min}$) required to reconstruct the emitted spectrum according to the Nyquist criterion. Equation (3) can also be represented as:

$$N_{min}=2\frac{B}{\Delta\lambda} \quad (3')$$

where B represents the spectral bandwidth of the emitted spectrum (i.e. the wavelength range of the spectrum to be reconstructed) and $\Delta\lambda$ represents the spectral resolution (i.e. the space between adjacent data points in the reconstructed spectrum).

The path length increment $\delta L=L_{(i+1)}-L_i$ according to the Nyquist criterion (i.e. the phase shift for an MZI) can be determined by $$\delta L = \frac{1}{N_{min}\delta\sigma n_{eff}} = \frac{1}{2(\sigma_{max}-\sigma_{min})n_{eff}} \quad (4)$$

and the maximum physical path length delay ($L_{max}$) according to the Nyquist criterion can be determined by $$L_{max}=N_{min}\delta L = \frac{1}{\delta\sigma n_{eff}} \quad (5)$$

A process for determining the spectrum of a sampled input signal may be represented in matrix notation. The received input signal can be represented as a continuous input spectrum p($\sigma$). The continuous input spectra may be discretized or sampled at a certain resolution to form an input column vector X of input spectra values or input spectra coefficients x(k)=p($\delta$($\sigma-\sigma_k$)). The output of the spectrometer can be defined as an output column vector Y with output spectra values or output spectra coefficients y. The output spectra coefficients y of the output column vector can be determined by applying a discrete cosine transformation (DCT) matrix $\Theta$ to the input spectra coefficients x:

$$y=\Theta x \quad (6)$$

If the input signal has been sampled according to the Nyquist criterion, and the DCT matrix $\Theta$ is known (or can be determined e.g. experimentally) then the input spectra coefficients x may be reconstructed from the output spectra coefficients y according to:

$$x=(\Theta^T)^{-1}\Theta y \quad (7)$$

Equation (7) may be considered generally equivalent to the inverse DCT so long as the input spectra coefficients x are fully sampled by the DCT matrix $\Theta$ according to the Nyquist criterion. As a result, the Nyquist criterion has typically been used to define the minimum number of samples to be acquired when reconstructing a spectrum from an input signal. This may, in effect, place a lower limit on the number of interferometers that have been used in spectrometer devices using arrays of interferometers. This can in turn place size and weight limitations on the device for a particular bandwidth and resolution, because of the number of interferometers required. Accordingly, to reduce the size of such a spectrometer device, bandwidth or resolution would typically have to be sacrificed.

Embodiments described herein may provide a spectrometer device and/or a spectrometry system in which the number of interferometers in the first plurality of interferometers can be fewer than the number of interferogram samples required to satisfy the Nyquist criterion for reconstructing an emitted spectrum with a spectral bandwidth B and a spectral resolution $\Delta\lambda$ from the input light signal. The total number of interferometers in the array of interferometers can also be fewer than the number of interferogram samples required to satisfy the Nyquist criterion.

In some cases, the number of interferometers in the first plurality of interferometers may be fewer than half the number of interferogram samples required to satisfy the Nyquist criterion. In some cases, the number of interferometers in the first plurality of interferometers may be less than ¼ the number of interferogram samples required to satisfy the Nyquist criterion.

The embodiments described herein may still permit an emitted spectrum of the input light signal to be reconstructed with the spectral bandwidth B and spectral resolution $\Delta\lambda$. This may allow smaller and lighter spectrometers to be manufactured while maintaining the same or similar bandwidth and resolution. In embodiments described herein, the emitted spectrum can be reconstructed using compressive sensing techniques.

Compressive sampling or compressive sensing techniques may permit accurate reconstruction of emitted signal spectra with fewer samples than required by the Nyquist criterion (see, for example, E. Candes and M. Wakin, "An Introduction To Compressive Sampling," *IEEE Signal Processing Magazine*, vol. 25, no. 2, pp. 21-30, 2008; D. A. Lorenz, M. E. Pfetsch, and A. M. Tillmann, "Solving Basis Pursuit: Heuristic Optimality Check and Solver Comparison," *ACM Trans. Math. Softw.*, vol. 41, no. 2, pp. 1-28, 2015; and S. Qaisar, R. M. Bilal, W. Iqbal, M. Naureen, and S. Lee, "Compressive Sensing: From Theory to Applications, A Survey," *Communications and Networks, Journal of*, vol. 15, no. 5, pp. 443-456, 2013, the entirety of each of which is incorporated herein by reference).

In order to reconstruct a signal with fewer samples than required by the Nyquist criterion, compressive sensing generally relies on two characteristics of the signal being analyzed. The first characteristic is that the signal to be analyzed is a sparse signal. A signal may be considered sparse when there exists some domain in which the signal may be represented as a combination of coefficients, very few of which are non-zero. For instance, a sinusoidal signal collected in the time domain would appear to be information-rich, however in the frequency domain the entire signal can defined using a single data point. Such a signal would be considered to be sparse in the frequency space domain.

In embodiments described herein, the spectrometer devices, systems and methods may be configured to measure input light signals having sparsely filled spectral channels. Various types of emitted signals, such as Raman emissions, laser-induced breakdown spectroscopy (LIBS) emissions, atomic emissions and molecular emissions may provide sparsely filled spectral channels. For example, the inventors have recognized that Raman signals tend to be sparse in the frequency domain and may thus be suitable for reconstruction using compressive sensing techniques.

The second characteristic is that the input signal is sampled in a basis that is incoherent with the representation basis. Incoherence between the sampling basis and the representation basis can increase the achievable undersampling rate of a compressive sensing process.

Embodiments described herein may sample the self-interference of an input light signal at various phase shifts (i.e. an interferogram). For example, an array of interferometers can be used to directly sample the phase coherence of an input signal in a cosine transformation basis. The phase shifts of the interferometers may correspond to points in time in what would be recognized as a time-series representation of the spectrum as provided by a classical temporally phase scanned Fourier Transform Spectrometer. This may provide a sampling technique that is incoherent with signals that are sparse in the frequency domain, such as Raman emissions.

By analyzing a sparse signal and applying compressive sensing, the inventors have found that the number of interferometers used in a spectrometer device can be reduced below that required by the Nyquist criterion. This may facilitate the design and manufacture of spectrometer devices with fewer interferometers. This may in turn lead to reductions in size and weight. Furthermore, such spectrometer devices may provide improved signal-to-noise ratio because each interferometer may receive a greater portion of the input light signal when fewer interferometers sample the input light signal.

In general, for a spectrum of length K, with S non-zero components the Nyquist criterion would require M=2K interferometric samples to reconstruct the input signal. As shown in Equation (3') above, K can be determined based on the bandwidth and resolution of the spectrum that is being reconstructed (i.e.)

$$K = \frac{B}{\Delta\lambda}$$

In embodiments described herein where an emitted spectrum is reconstructed using compressive sensing, the number of samples M required can be reduced according to:

$$M = c \cdot S \log(K) \tag{8}$$

where c represents a sensing constant reflecting achievable undersampling of the particular compressive sensing technique applied.

Equation (8) may also be represented in term of the spectral bandwidth B, spectral resolution $\Delta\lambda$ and an undersampling coefficient c' of the compressive sensing technique:

$$M = 2\frac{B}{\Delta\lambda}c' \tag{8'}$$

where 0<c'<1.

The undersampling coefficient can depend on the compressive sensing technique used, as well as incoherence between the sampling technique and the representation basis of the input signal.

Given a phase-varying sinusoidal signal x represented in the cosine transformation basis $\Psi$, sampling of the cosine transformation basis may be considered equivalent to multiplication of $\Psi$ by a sensing matrix $\Phi$. For example, the signal may be a time-domain sinusoidal signal from a temporally phase scanning FTS, or the signal may be comprised of a set of signals from a spatially distributed array of fixed interferometers with different phase shifts. If the coefficients of the phase-varying signal are fully sampled in the cosine transformation basis, i.e. the system is fully Nyquist sampled, then the sensing matrix $\Phi$ may be determined as the identity matrix I:

$$y = \Phi \Psi x \quad (9)$$

$$y = I \Psi x \quad (10)$$

$$y \approx \Theta x \quad (11)$$

In general, in a compressive sensing approach to reconstructing an emitted spectrum (i.e. for sensing S non-sparse spectral components), the sensing matrix $\Phi$ can be defined by randomly selecting M cosine coefficients to measure or sample. This may be considered equivalent to randomly selecting M rows of an K×K identity matrix. The sensing matrix and the cosine transformation basis matrix can then be applied in a minimization process to solve Equation (9). The minimization process may involve minimizing the $l_1$-norm which can provide a stable solution to Equation (9). For example, the $l_1$-norm may be minimized using a primal-dual interior point search. Such a minimization process may be implemented using various minimization software applications such as $l_1$-Magic. Other examples of compressive sensing methods used in embodiments herein may include basis-pursuit routines, belief-propagation (BP) or seeded-belief-propagation (s-BP) methods, greedy solvers, orthogonal matching-pursuit (OMP) and least absolute shrinkage and selection operator (LASSO).

As mentioned, the compressive sensing techniques described herein can be typically applied to sparse signals. However, real emitted optical spectra (e.g. Raman, LIBS, atomic/molecular spectra) may be contaminated by broadband/slowly-varying background signals such as thermal Planck signals in the infrared spectrum, and fluorescence in the visible spectrum. This may result in the input light signal received by a spectrometer device being non-sparse. Such background contamination may impact the reliability of using compressive sensing to reconstruct the emitted spectrum with below-Nyquist sampling of the input signal.

Embodiments described herein may remove signal components that may correspond to the background contamination in an input signal. This may allow the emitted spectrum to be reconstructed from the input signal using below-Nyquist sampling even in the presence of contamination. Embodiments described herein may identify broadband signal components (also referred to as slowly-varying signal components or low-resolution signal components) in the input signal. These signal components can be removed to provide a pre-processed signal that may be sparse and can be used with compressive sensing techniques.

Such background or contamination signal components may be generally consistent across the spectrum of interest (i.e. the spectral range or bandwidth of the spectrometer device/system/method). Accordingly, low-resolution samples of the input signal may be used to reconstruct a low-resolution spectrum. The low-resolution spectrum/low-resolution spectral signal components can then be removed from the emitted spectrum samples of the input signal in pre-processing. The low-resolution spectrum may be considered an approximation of the background or contamination signal components. The low-resolution spectrum may also be referred to as a slowly-varying spectrum or background spectrum in some cases.

In some cases, to identify the low-resolution spectrum the input signal may be fully Nyquist sampled over the same spectral bandwidth, but with a much lower resolution (i.e. a much larger step size between adjacent samples) than the emitted spectrum sampling. As mentioned, background contamination signals or signal components such as fluorescence and Planck emissions may be expected to vary slowly. Accordingly, such signal components may be represented in a Nyquist sampled-spectrum with many fewer samples.

A Fourier transform can be applied to the low-resolution Nyquist samples, and smoothly varying/low-resolution spectral components can be determined. These smoothly varying or low-resolution spectral components may then be removed from the samples of the input signal used to reconstruct the emitted spectrum. This may result in a pre-processed discrete interference pattern that includes only (or mostly) sharp line emission spectral signals (i.e. sparse emitted signal components, such as Raman signal components) that are suited for reconstruction using compressive sensing.

The low-resolution spectral components may be determined using the discrete cosine transform at the phase shift of each interferometer in the array. For example, equation (2) may be used to determine low-resolution spectral components corresponding to the self-interfering signals output from each interferometer in the first plurality of interferometers by substituting the determined low-resolution spectrum for $p^{in}(\sigma)$ and substituting the phase shift of each interferometer for $2\pi n_{eff} L_i$. These low-resolution spectral components can then be subtracted from the corresponding self-interfering signals to provide pre-processed self-interfering signals. The pre-processed self-interfering signals may be suitable for reconstruction using compressive sensing methods. A pre-processed discrete interference pattern can then be determined from the pre-processed self-interfering signals.

In some cases, the phase shift of each interferometer may vary as a result of the temperature of the system. In some case, this phase shift variation may be measured directly. In other cases, the phase shift variation may be determined based on detection of reflected laser light wavelength. Deviations from the design temperature may add an identifiable signal pattern characteristic of the temperature of the interferometer array to the plurality of self-interfering signals output from the array of interferometers. Correction factors may be determined based on the system temperature, and used to account for variations in the phase shifts of the interferometers.

In some embodiments, the array of interferometers may include a second plurality of interferometers. The second plurality of interferometers may be used to detect low-resolution signal components in the input light signal. The second plurality of interferometers can generally include fewer interferometers than the first plurality of interferometers. Even when the second plurality of interferometers are included, the array of interferometers can include fewer interferometers than would be required by the Nyquist criterion between the first plurality of interferometers and the second plurality of interferometers.

In some cases, the array of interferometers may include fewer than ½ the number of interferometers that would be required by the Nyquist criterion. The array of interferometers may include fewer than ⅓ the number of interferometers that would be required by the Nyquist criterion. In some cases, the array of interferometers may include fewer than ⅙ the number of interferometers that would be required by the Nyquist criterion.

Each interferometer in the second plurality of interferometers can be configured to output a low-resolution self-interfering signal with a known phase shift. The plurality of low-resolution self-interfering signals output by the second plurality of interferometers may be referred to as a second plurality of self-interfering signals or a plurality of low-resolution (or slowly varying or broadband or background) self-interfering signals.

The second plurality of interferometers can be configured to provide a fully-Nyquist sampled reconstruction of the spectrum with the spectral bandwidth B, but with a low-resolution spectral resolution $\Delta\lambda_{low}$ that is lower resolution than the spectral resolution $\Delta\lambda$ being used for the reconstruction of the emitted spectrum. For example, in some cases $\Delta\lambda_{low} > 2\Delta\lambda$. In some cases, $\Delta\lambda_{low} > 4\Delta\lambda$. In some cases, $\Delta\lambda_{low} > 10\Delta\lambda$.

The interferogram samples required to satisfy the Nyquist criterion for the spectral bandwidth B and the low-resolution spectral resolution of $\Delta\lambda_{low}$ may correspond to a second plurality of Nyquist phase shifts. The phase shifts of the interferometers in the second plurality of interferometers can be selected to correspond to the second plurality of Nyquist phase shifts. A low-resolution spectrum of the input signal may then be determined from the second plurality of self-interfering signal outputs.

Low-resolution spectral signal components from the low resolution spectrum can be identified. The low-resolution spectrum may be identified as defining the low-resolution spectral signal components. A pre-processed discrete interference pattern may then be generated by removing the contribution of the low-resolution spectral signal components from the discrete interference pattern (generated from the self-interfering signal outputs from the first plurality of interferometers). The pre-processed discrete interference pattern may then provide a sparse signal suitable for reconstruction of the emitted signal spectrum using compressive sensing.

Embodiments described herein may provide a spectrometer device, spectrometer system and spectrometer method that permits the emitted spectrum from a sample or target or location of interest to be reconstructed from an input light signal using fewer samples than are required by the Nyquist criterion. Embodiments herein may use compressive sensing to reconstruct the emitted spectrum. This may provide a spectrometer with increased signal to noise ratio. This may also provide a spectrometer with reduced size and/or weight.

In some cases, the spectrometer may be implemented in an optical waveguide chip. The spectrometer may be implemented using planar waveguides on a single chip. Various materials may be used for the chips, such as silicon, silicon dioxide or fused silica, silicon nitride, germanium, indium phosphide and other wafer materials. For example, the spectrometer may be Raman spectrometer device implemented in an optical waveguide chip.

By reducing the number of interferometers required, embodiments described herein may allow for greater bandwidth and resolution to be achieved in devices implemented on a single optical chip. In some cases, the waveguides and corresponding interferometers may be implemented on a single 22×22 mm chip, such as a single photolithography reticle.

As mentioned, the waveguides and corresponding interferometers in the array of interferometers may be spatially distributed. As a result, there may be gaps between adjacent waveguides. It may be desirable to focus an input light signal into the waveguides to improve the amount of light transmitted to each waveguide, and in turn to each interferometer. Focusing the input light signal into the waveguides may avoid losing some light that would otherwise be directed towards gaps between the waveguides.

Some embodiments described herein may provide optical coupling or optical couplers to direct the input light signal to the plurality of waveguides. The optical coupling can include a mirror array with a plurality of mirrors. The plurality of mirrors may correspond to the plurality of waveguides. Each waveguide can have a corresponding mirror in the mirror array. Each mirror in the mirror array may be angled to direct the input light signal to the corresponding input waveguide.

In some cases, a plurality of lenses may also be provided to couple the input light signal to the plurality of waveguides. The plurality of lenses may be provided with the input aperture (or may define an aperture output of the input aperture). The plurality of lenses may be arranged as a grid of lenses. For example, a micro-lens array may be used to provide the plurality of lenses.

The plurality of lenses may correspond to the mirror array. Each mirror in the mirror array can have a corresponding lens in the plurality of lenses. The lenses in the plurality of lenses can be directed to focus the input light signal on the mirrors in the mirror array. Each lens can be directed to focus a portion of the input light signal on the corresponding mirror in the mirror array. The plurality of lenses may be fixed in this focused position to provide repeatable and reliable optical coupling of an input light signal to the mirror array and to the waveguides.

Referring now to FIG. 1, shown therein is an example of a spectrometry system 100 in accordance with an embodiment. The spectrometry system 100 generally includes an input aperture 102, optical coupling 104, a plurality of input waveguides 106, an interferometer array 108, a detector array 112, memory 114, and a controller 116. The spectrometry system 100 can also include a light source 118.

In some embodiments, components of the spectrometry system 100 such as the input aperture 102, optical coupling 104, input waveguides 106, interferometer array 108, detector array 112, memory 114, and controller 116 may be implemented as a spectrometer device. The spectrometer device can also include the light source 118. In some cases, the spectrometer device may be a handheld spectrometer device. In some cases, a multi-unit spectrometer may be provided that includes multiple spectrometer devices that may each correspond to spectrometer system 100.

The input aperture 102 can receive an input light signal 120. The input light signal 120 may be an emitted or scattered signal from a sample of interest 126. The input light signal 120 may be scattered in response to excitation of the sample 126 using an excitation source such as light source 118. The received input light signal 120 can include emitted signal components from the sample/target of interest 126. Emitted signal components may refer to signal emissions from the sample/target of interest 126 that can be used to spectroscopically analyze the sample/target of interest 126, such as Raman emissions, Laser-induced breakdown spectroscopy (LIBS) emissions, atomic emissions, molecular emissions and the like. The received input light signal 120 may also include background and/or contaminant signals components, such as fluorescence and/or Planck signals.

The input aperture 102 can be configured to direct the input light signal 120 to the plurality of waveguides 106 using the optical coupling 104. The input aperture 102 may be secured to (although displaced from) the surface of the spectrometer system 100 on which the plurality of waveguides 106 are provided. The input aperture 102 can include an aperture output facing towards the surface of the spectrometer system 100.

The optical coupling 104 can be configured to direct the input light signal 120 to each of the waveguides 106. The input aperture 102 and optical coupling 104 may include one or more optical components that function to direct the input light signal 120 from free space into the plurality of waveguides 106. The optical coupling 104 may be used by itself in any suitable spectrometer or in any suitable combination or sub-combination with any other feature or features disclosed herein.

The plurality of waveguides 106 can be optically coupled to the input aperture 102. As explained above, optical coupling 104 may couple the input aperture 102 to the plurality of waveguides 106. The plurality of waveguides 106 can also be optically coupled to the array of interferometers 108. The plurality of waveguides 106 may receive input light signal 120 from the input aperture 102 (e.g. via optical coupling 104). The plurality of waveguides 106 may then direct the received light signal to the array of interferometers 108.

The characteristics of the waveguides 106 may depend on the spectrum of interest or spectral range of the spectrometry system 100. For example, the waveguides 106 may be designed to be single mode for the wavelengths of interest in spectrometer system 100.

For instance, a spectrometry system 100 may operate with a spectral range or waveband from 532 nm to 641 nm. The waveguides 106 may then be manufactured using materials that are single mode in this waveband. For example, SiN may be transparent and signal mode in the waveband from 532 nm to 641 nm. The waveguides 106 may then be manufactured using SiN (e.g. using TriPleX™ waveguides available from LioniX).

In some embodiments, the waveguides 106 may be designed using a single strip configuration. In other embodiments, double-strip configurations may be used. In some case, double strip geometry may be preferred as it may provide a higher confinement waveguide. This may in turn provide a more compact spectrometry system 100. For instance, using the TriPleX™ waveguides mentioned above, double-strip geometry may be used which is approximately 350 nm wide and approximately 200 nm thick, and is single mode in the waveband from 532 nm to 641 nm.

For different wavelength ranges/wavebands, the characteristics and/or configuration of waveguides 106 may be modified. In some cases, the cross-section of the waveguides 106 may be adjusted to maintain single-mode operation for different wavelength ranges. For instance, a spectrometry system 100 operating in a range close to 1064 nm may require a larger waveguide core. A spectrometry system 100 operating at in a range <350 nm may require a waveguide core material with better transmission properties in the U.V. shorter wavelengths.

In some cases the plurality of waveguides 106 may define a waveguide section of the spectrometry system 100. The waveguide section can include a plurality of waveguide regions within the waveguide section defined by waveguides 106.

For example, the plurality of waveguides 106 may define an input waveguide region coupled to the aperture 102. The waveguides 106 may also include a fan-out region (not shown) between the input waveguide region and the interferometer array 108. For instance, the plurality of waveguides 106 may define fewer separate waveguide paths in the input waveguide region than there are interferometers 110 in the interferometer array 108. The fan-out region may then fan out or split the waveguides 106 from the input waveguide region into sufficient waveguide paths to direct light (i.e. a portion of the input light signal 120) to each of the interferometers 110 in the interferometer array 108.

For example, the waveguides 106 may define 40 separate input waveguide paths in the input waveguide region while the interferometer array 108 includes 200 interferometers 110. The input aperture 102 may be coupled to the 40 input waveguide paths in the input waveguide region. The fan-out region may then fan out each of the 40 input waveguide paths 5:1 to direct a portion of the input light signal 120 to each of the interferometers 110.

In some cases, the waveguide section may include an interferometer region. The interferometer array 108 may be provided in the interferometer region of the waveguide section. That is, the plurality of waveguides 106 may be used to define the interferometers 110 in the interferometer array 108 (e.g. by splitting to provide a separate reference signal path and delay signal path for each interferometer 110).

In some cases, the waveguides 106 may also be configured to discard unwanted signal polarizations. For example, a 90 degree bend may be added to the waveguides 106 in the input waveguide region to discard TM polarization.

The array of interferometers 108 in system 100 includes interferometers 110A-110N. Each interferometer 110 can have a signal input and a signal output. Each interferometer 110 can be configured to receive a portion of the input light signal 120 from a waveguide 106. The interferometer 110 can be configured to output a self-interfering signal 122 with a known phase shift in response to receiving the portion of the input light signal 120. Each interferometer 110 may output a fixed self-interfering signal 122 that represents self interference of the received portion of the input light signal 120 at the phase shift of that interferometer 110. The array of interferometers 108 may be used by itself in any suitable spectrometer or in any suitable combination or sub-combination with any other feature or features disclosed herein.

The array of interferometers 108 can include a first plurality of interferometers. As shown in spectrometer system 100, the first plurality of interferometers includes interferometers 110G, 110G, 110D, 110E, 110N. The phase shift for each interferometer 110 in the first plurality of interferometers can be different from the phase shift of every other interferometer 110 in the first plurality of interferometers.

In some embodiments, each interferometer 110 may have a defined optical path length difference between two substantially equally divided portions of the signal. The equally divided portions of the signal can later be re-combined to provide the self-interfering signal at the signal output of the interferometer 110. This can be the case where the array of interferometers 108 is implemented using Mach-Zehnder interferometers. In such cases, the phase shift for each interferometer 110 can be defined by the optical path length difference for that interferometer 110.

In general, the phase shift corresponding to each interferometer 110 can be implemented by any method for creating self-interference between a portion of the signal received from the waveguide 106 and another portion of the signal received from the waveguide 106 with a known relative phase shift. For example, Fabry-Perot interferometers may be used to provide the interferometers 110.

In the spectrometer system 100, the number of interferometers 110 in the first plurality of interferometers can be fewer than the number of interferogram samples required to satisfy the Nyquist criterion for reconstructing an emitted spectrum from the input light signal 120 with a spectral bandwidth B and a spectral resolution $\Delta\lambda$. The first plurality of interferometers in the spectrometer system 100 may be configured to provide a first plurality (or emission spectrum plurality) of self-interfering signals that can be used to reconstruct the emitted spectrum using compressive sensing techniques.

The number of interferometers in the first plurality of interferometers may be determined based on the spectral bandwidth B, the spectral resolution $\Delta\lambda$ and the achievable undersampling of a particular compressive sensing process (e.g. undersampling coefficient c'). For example, the undersampling coefficient c' can be in the range of c'=⅕. In some cases, the undersampling coefficient may be in the range of c'=⅛.

The undersampling coefficient c' for a signal of interest can vary based on the compressive sensing reconstruction method employed. The density of information in the input signal, p (e.g. the number of Raman signal components vs. the total number of signal components) can also affect the undersampling coefficient c. To achieve a perfect reconstruction (e.g. a root mean square error of 0) for input signals with information density p=0.15 (comparable to an FT Raman signal when measured against the number of Nyquist samples required) a compressive sensing reconstruction method such as an l1-minimization or basis-pursuit routine may achieve an undersampling coefficient of 0.5>c'>0.4. Some compressive sensing reconstruction methods, such as belief-propagation (BP) methods or seeded-belief-propagation (s-BP) methods may achieve an undersampling coefficient of 0.4>c'>0.3 or 0.1>c'>0.2 respectively. Various other compressive sensing reconstruction methods may be used in embodiments herein such as greedy solvers, orthogonal matching pursuit (OMP) and least absolute shrinkage and selection operator (LASSO), each of which may have their own signal-dependent undersampling coefficients (See, for example, F. Krzakala, M. Mézard, F. Sausset, Y. F. Sun, and L. Zdeborová, *Statistical-Physics-Based Reconstruction in Compressed Sensing*, Phys. Rev. X 2, 021005, 2012; and B. L. Sturm, M. G. Christensen and R. Gribonval, *Cyclic pure greedy algorithms for recovering compressively sampled sparse signals*, 2011 Conference Record of the Forty Fifth Asilomar Conference on Signals, Systems and Computers (ASILOMAR) pp. 1143-1147., 2011, the entirety of both of which are incorporated herein by reference).

The undersampling coefficient may permit a corresponding reduction in the number of interferometers in the first plurality of interferometers as compared to the number of samples or interferometers that would be required by the Nyquist criterion. For example, the number of interferometers x required for the first plurality of interferometers may be determined by $$x = 2\frac{B}{\Delta\lambda}c'$$

as shown by equation (8') above.

The interferogram samples required to satisfy the Nyquist criterion for the spectral bandwidth B and spectral resolution $\Delta\lambda$ may generally correspond to a plurality of Nyquist phase shifts. The phase shift for each interferometer 110 in the first plurality of interferometers may be selected from the plurality of Nyquist phase shifts to permit reconstruction of the emitted spectrum with the spectral bandwidth B and the spectral resolution $\Delta\lambda$ from the first plurality of self-interfering signals using compressive sensing.

The phase shifts of the interferometers 110 in the first plurality of interferometers may be selected from amongst the phase shifts that would be used to reconstruct the spectrum of the input light signal 120 if the input light signal 120 was fully Nyquist sampled. In other words, the phase shifts of the interferometers 110 in the first plurality of interferometers can be a proper subset of the phase shifts for a fully Nyquist sampled set.

In some cases, e.g. using MZI interferometers implemented by waveguides 106, the phase shifts for the fully Nyquist sampled set (the plurality of Nyquist phase shifts) corresponding to the spectral bandwidth B and the spectral resolution $\Delta\lambda$ can be determined based on the spectral bandwidth B, the spectral resolution and the refractive index of the waveguide n. The maximum phase shift may be determined according to equation (5) set out above as $$L_{max} = \frac{1}{\Delta\sigma n_{eff}}.$$

Using the Nyquist-Shannon theorem, the minimum phase shift may be determined based on the maximum phase snits as $$L_{min} = \frac{L_{max}}{2B/\Delta\lambda}.$$

The phase shifts in the plurality of Nyquist phase shifts can then be determined as integer multiples of $L_{min}$ until $L_{max}$ is reached. The phase shifts for the interferometers in the first plurality of interferometers may then be selected from among the plurality of Nyquist phase shifts.

The phase shifts may be selected as random elements from the phase shifts for the fully Nyquist sampled set satisfying the restricted isometry principle (i.e. a proper subset of phase shifts in the plurality of Nyquist phase shifts satisfying the restricted isometry principle). In some cases, deterministic methods for selecting the phase shifts for the interferometers in the first plurality of interferometers while satisfying the restricted isometry principle may be used. In some cases, the phase shifts for the first plurality of interferometers can be selected randomly from the plurality of Nyquist phase shifts.

In some embodiments, one or more thermo-optic or waveguide heaters may be included in spectrometry system 100. The waveguide heaters may include interferometer-specific heaters associated with each of the waveguide interferometers 110 (or each of the interferometers 110 in the first plurality of interferometers). The phase delays of the interferometers 110 may be adjusted by heating an interferometer 100 using the corresponding heater. In some embodiments, other phase shifting elements may be used in spectrometer 100. For example, active electro-optic phase shifting elements may be used to adjust the phase shifts of interferometers 110.

In some cases, the number of interferometers in the first plurality of interferometers may be less than or equal to half the number of interferogram samples required to satisfy the Nyquist criterion. In some cases, the number of interferometers in the first plurality of interferometers may be less than or equal to ¼ the number of interferogram samples required to satisfy the Nyquist criterion.

The number of interferometers in the interferometers array 108 may depend on the wavelength of interest and the application for spectrometer system 100. In general, the array of interferometers 108 can include not fewer than 10 interferometers. Depending on the application, the array of interferometers 108 may include many more interferometers 110.

In some cases, the array of interferometers 108 can be provided on a single chip. The plurality of waveguides 106 may also be provided on the chip. Thus, the number of interferometers 110 may be limited by the dimensions of the chip. For example, in some embodiments the array of interferometers 108 may include not greater than 1000 interferometers. In some embodiments, the array of interferometers 108 may include not greater than 500 interferometers. In some embodiments, the array of interferometers 108 may include not greater than 250 interferometers.

Various different types of chips/wafers may be used, such as fused silica chips, silicon chips, silicon nitride chips, germanium chips, indium phosphide chips etc. The interferometers 110 may be etched onto the surface of the chip. Similarly, the plurality of waveguides 106 can be etched onto the surface of the chip.

In some cases, the array of interferometers 108 can also include a second plurality of interferometers 110. In spectrometer system 100, the second plurality of interferometers may include interferometers 110C and 110N−1. The second plurality of interferometers 110 may be used to generate a second plurality (or low-resolution plurality) of self-interfering signals. The second plurality of self-interfering signals may also be detected by the detector array 112.

In some embodiments, the interferometers 110 in the second plurality of interferometers may be interspersed among the interferometers 110 in the first plurality of interferometers. In some embodiments, the interferometers 110 in the second plurality of interferometers may occupy a separate portion of the interferometer array 108 from the interferometers 110 in the first plurality of interferometers. In some embodiments, the spatial position of the interferometers 110 in the second plurality of interferometers vis a vis the interferometers 110 in the first plurality of interferometers may vary without impacting operation of spectrometer 100.

The second plurality of self-interfering signals can be used to generate a low-resolution spectrum from the input light signal 120. The low-resolution spectrum can be used to identify low-resolution spectral components in the received input light signal 120. The low-resolution spectral components may interfere with the compressive sensing techniques used to reconstruct the emitted spectrum from samples of the input light signal. The low-resolution spectral components may then be used to determine a pre-processed discrete interference pattern from the first plurality of self-interfering signals 122 to facilitate reconstruction of the emitted spectrum.

The second plurality of interferometers may be configured to acquire a low-resolution set of interferometric samples of the input light signal 120 across the spectral bandwidth B. The low-resolution set of interferometric samples can satisfy the Nyquist criterion for a lower spectral resolution.

The lower resolution spectrum may be a low-resolution spectrum having the spectral bandwidth B and a low-resolution spectral resolution of $\Delta\lambda_{low}$ where $\Delta\lambda_{low} > \Delta\lambda$. The number of interferometers and the phase delays of the interferometers 110 in the second plurality of interferometers can be selected, to generate a low-resolution spectrum of the input signal 120 over the spectral bandwidth B with a second/low-resolution spectral resolution $\Delta\lambda_{low} >> \Delta\lambda$. In some cases, as described below, a subset of the interferometers in the second plurality of interferometers may be used to generate the low-resolution spectrum.

For example, the low-resolution spectral resolution may be less than half the resolution of the emitted signal spectrum being reconstructed (i.e. the steps between adjacent samples may be $\Delta\lambda_{low} > 2\Delta\lambda$). The number of interferometers in the second plurality of interferometers can be not less than the number of interferogram samples required to satisfy the Nyquist criterion for reconstructing the low resolution spectrum of the input light signal.

The phase shifts for the second plurality of interferometers can be determined in order to satisfy the Nyquist criterion based on the spectral bandwidth B and the low-resolution spectral resolution $\Delta\lambda_{low}$ as explained above. That is, the interferometric samples required to satisfy the Nyquist criterion for the spectral bandwidth B and the spectral resolution of $\Delta\lambda_{low}$ may correspond to a second plurality of Nyquist phase shifts, and the phase shifts of the interferometers 110 in the second plurality of interferometers can be selected to correspond to the second plurality of Nyquist phase shifts.

In general, the second plurality of interferometers can include fewer interferometers 110 than the first plurality of interferometers. In some embodiments, the number of interferometers 110 in the second plurality of interferometers can comprise fewer than 50% of the number of interferometers 110 in the first plurality of interferometers. In some embodiments, the number of interferometers 110 in the second plurality of interferometers can comprise fewer than 25% of the number of interferometers 110 in the first plurality of interferometers. In some embodiments, the number of interferometers 110 in the second plurality of interferometers may even comprise fewer than 10% of the number of 110 interferometers in the first plurality of interferometers.

Depending on the expected operating conditions of spectrometry system 100, the configuration of the interferometer array 108 may differ. For instance, a system 100 in which no background or fluorescent contamination is expected (i.e. the input light signal is a sparse emission signal) may not require the second plurality of interferometers. The number of interferometers in the second plurality of interferometers may also depend on the expected operational conditions of the system 100.

In some cases, the low-resolution (i.e. background or slowly varying signal components) may be identifiable from only 3-4 low-resolution samples. However, more complex background signals may require additional interferometers for the second plurality of interferometers.

In embodiments of system 100 employing the second plurality of interferometers, the second plurality of interferometers may include about 10 interferometers or more. In some embodiments, the number of interferometers in the second plurality of interferometers may be in the range of about 30-40 interferometers.

In general, the array of interferometers 108 can include fewer interferometers 110 than the number of samples required for the Nyquist criterion to be satisfied, even when both the first plurality of interferometers and the second plurality of interferometers are included.

The detector array 112 can be optically coupled to the interferometer array 108. The detector array 112 can detect a first plurality of self-interfering signals 122 from the signal outputs of the interferometers 110 in the first plurality of interferometers. The first plurality of self-interfering signals 122 can include the self-interfering signal 122 from the signal output of each of the interferometers 110 in the first plurality of interferometers. The first plurality of self-interfering signals 122 from the signal outputs of the interferometers 110 in the first plurality of interferometers may be referred to as an emitted spectrum set of self-interfering signals.

The detector array 112 may also detect a second plurality of self-interfering signals 122 from the signal outputs of the interferometers 110 in the second plurality of interferometers. The second plurality of self-interfering signals 122 can include the self-interfering signal 122 from the signal output of each of the interferometers 110 in the second plurality of interferometers. The second plurality of self-interfering signals 122 may be referred to as a low-resolution set of self-interfering signals.

The first plurality of self-interfering signals 122 from the signal outputs of the interferometers 110 in the first plurality of interferometers may be combined into an interference pattern corresponding to the input signal. The interference pattern may be a discrete interference pattern that is built up based on the first plurality of self-interfering signals 122 from the signal outputs of the interferometers 110 in the first plurality of interferometers.

Similarly, the second plurality of self-interfering signals from the signal outputs of the interferometers 110 in the second plurality of interferometers may be combined into a low-resolution interference pattern corresponding to the input signal 120.

The detector array 112 may include a plurality of detector elements. Each interferometer 110 in the array of interferometers 108 may have a corresponding detector element in the detector array 112. Each detector element may be used to detect the self-interfering signal 122 from the signal output of the corresponding interferometer 110.

The detector array 112 may be aligned with the signal outputs of the interferometers 110 in the interferometer array 108. The signal outputs from the interferometers 110 may be aligned with a row of the detector array 112. For example, the detector array 112 may be a charge-coupled device or CMOS-based detector. An electronically gated scientific camera may also be used.

In some cases, the detector array 112 may provide time-resolved detection of the self-interfering signals 122 corresponding to the input signal 120. The detector array 112 may provide periodic detection with a defined period or frequency. For example, the detector array 112 may be a charge-coupled device with a shift register to provide time-resolved spectra at the timing of the line shift (e.g. 1 MHz). The detector array 112 may be provided as an ROIC circuit. A CMOS ROIC may be provided with a periodic (e.g. 1 MHz) transfer into an output capacitor. This may also provide for time-resolved detection of the self-interfering signals 122.

Time-resolved signal detection may facilitate applications operating during daylight or in higher light conditions. The time-resolved signal detection may also facilitate identification and removal of background fluorescence and luminescence signals from the emitted signal components that may be present only in response to a pulse emitted from light source 118.

In some embodiments, the detector array 112 may include an Electron Multiplying CCD. This may provide improved signal to noise for a faint emitted signal (that has been multiplexed into a plurality of waveguides 106). The EMCCD may be configured to operate in a high gain analog mode. This may provide a detector array 112 with a gain of upwards to 1000×. The EMCCD may also be configured to provide frame transfers for time-resolved detection.

An example data collection process may now be described for a detector array 112 synchronized with a light source 118. The data collection process may begin by flushing the detector array 112 to remove any residual signal values from previous data collection.

The controller 116 may transmit a trigger pulse to the light source 118 and detector array 112. The trigger pulse may provide synchronization between the detector array 118 and light source 118. The trigger pulse can trigger the transmission of an excitation light pulse 124 from light source 118 to the sample of interest 126. The detector array 122 may be synchronized to the emitted laser pulses, e.g. with a 1 MHz transfer rate.

The detector array 112 may then detect self-interfering signals 122 output from the array of interferometers 108. As explained above, the detected self-interfering signals 122 may include a first plurality of self-interfering signals from the interferometers 110 in the first plurality of interferometers. The detected self-interfering signals 122 may also include a second plurality of self-interfering signals 122 from the interferometers 110 in the second plurality of interferometers in embodiments using the second plurality of interferometers. The detected self-interfering signals 122 can be transferred (e.g. using a frame transfer for CCD or a CTIA charge transfer for ROIC) and then stored in memory 114.

The detection and storage of self-interfering signals 122 may be repeated multiple times. For example, the data collection process may be repeated until a reduced fluorescence state is identified. To identify a reduced fluorescence state, the intensity levels of the self-interfering signals 122 from the interferometers 110 in the second plurality of interferometers may be monitored. When the intensity levels are identified to have dropped a threshold amount, it may be determined that the fluorescence has been reduced.

In some cases, the data collection process may be repeated while adjusting the phase delays of interferometers 110 in the first plurality of interferometers. For example, in some embodiments thermo-optic heaters may be coupled to each (or a subset) of the interferometers 110 in the first plurality of interferometers. The controller 116 may randomly adjust the phase delays of the interferometers 110 using the thermo-optic heaters (e.g. using a random number generator). This may provide multiple measurements with different samples of the time-series. In other embodiments, active electro-optic phase shifting elements may be used.

The repeated data collection process may permit a plurality of distinct discrete interference patterns to be generated for a particular emitted spectrum. This may allow the emitted spectrum to be reconstructed a plurality of times, and the reconstructions may be averaged to determine the emitted spectrum. This may suppress noise in the reconstructed signal.

As mentioned, the array of interferometers 108 may be provided on a spectrometer chip. The detector array 112 may be provided as a separate detector chip. The spectrometer chip may be bonded onto the detector chip with no air gap using an optical adhesive. The spectrometer chip may be bonded horizontally onto the detector chip with a 90 degree out-of-plane mirror bend at the output facet to allow the spectrometer chip to sit flat on the detector chip when bonded thereto.

Memory 114 may generally be a computer-readable storage medium. The memory 114 can be coupled to the detector array 112. The memory 114 may be used to store at least one interferometric output signal based on the plurality of self-interfering signals 122 output from the interferometers 110 in the first plurality of interferometers detected by the detector array 112. For instance, the at least one interferometric output signal may be stored as the plurality of self-interfering signals 122 or as an interference pattern. The memory 114 may also be used to store at least one low resolution output signal based on the second plurality of self-interfering signals 122 output from the interferometers 110 in the second plurality of interferometers detected by the detector array 112.

In some cases, the controller 116 may be implemented using a computer processor, such as a general purpose microprocessor. In some other cases, controller may be a field programmable gate array, application specific integrated circuit, microcontroller, or other suitable computer processor, or controller. The controller 116 may be configured to provide control and/or synchronization between various components of spectrometer 100.

The controller 116 may be configured to perform various aspects of a process for reconstructing an emitted spectrum, such as methods 200 and 300 described below. In other cases, the spectrometry system 100 may be communicatively coupled to a remote processor that may perform aspects of a process for reconstructing an emitted spectrum, such as methods 200 and 300 described below.

Optionally, a light source 118 can be included in the spectrometry system 100. Typically, the light source 118 can be included where the spectrometry system 100 is used to excite a sample or location of interest 126 using an excitation light signal 124 such as a laser pulse. The light source 118 can be configured to transmit an excitation light signal 124 with a known wavelength towards the location of interest 126. The excitation light 124 can be used to excite the location of interest 126 to cause emissions which may be reconstructed from the input light signal 120.

For example, spectrometry system 100 may be used in laser induced breakdown spectrometry. The light source 118 may be a laser light source configured to emit a pulse of laser light 124. The laser light pulse 124 may induce the sample of interest 126 to emit scattered light signals, including the input light signal 120.

The wavelength of the light source 118 may vary depending on the wavelength of interest in the particular application of the spectrometry system 100. In some cases, the light source 118 may be a Raman laser. Various embodiments may use Raman lasers with wavelengths such as <250 nm, 325 nm, 532 nm, 633 nm, 785 nm, 1064 nm.

For example, the light source 118 may be a 532 nm Raman laser with a linewidth and spectral drift<the desired spectral resolution $\Delta\lambda$. The light source 118 may be approximately 100 mW power in some cases. The light source 118 may be pulsed with a defined frequency using transistor-transistor logic. The light source pulse 124 can be synchronized with the detector array 112. The light source 118 may be hybridized to the same chip carrier as the detector array 112 and the waveguides 106 and interferometer array 108.

In some cases, the spectrometer system 100 may include a light source 118 with a transmission/reception head at the wavelength of interest. This may be configured to direct the received scattered light signal 120 into the waveguides 106 at high étendue. The outgoing laser pulse 124 from the light source 118 can be transferred using a multi-mode fiber (MMF). For example, where the light source 118 emits a 532 nm laser pulse a MMF with a 100 micron core may be used. The outgoing laser pulse 124 may be focused on the sample of interest 126 using an objective lens. For example, the objective lens may be an oversized objective lens positioned with an approximately 1 cm standoff.

In some embodiments, the input aperture 102 may receive the input light signal 120 using optical components used to emit the excitation signal 124 from light source 118. The scattered signal emitted by the sample 126 may be hemispherically scattered in response to the excitation signal 124. The objective lens may collimate the received scattered signal 120. The collimated scattered signal 120 may then be split onto a return path to the input aperture 102 using a dichroic. In some cases, the laser return signal may be blocked using a notch filter.

The received scattered signal 120 may initially be transmitted using a multi-mode fiber. In some cases, the input aperture 102 and optical coupling 104 may include mode conversion optics to convert the multi-mode fiber to a plurality of single-mode fibers. That is, the mode conversion optics may convert the received light signal 120 from transmission using a multi-mode fiber to provide single-mode transmission that may be suitable for a plurality of single-mode fibers, such as may be used for waveguides 106.

In general, the mode conversion optics may be configured to convert a multimode fiber comprising a plurality of distinct modes of light (e.g. 50 distinct modes) into an array of single-mode fibers. For example, in some cases the mode conversion optics may include a photonic lantern. In some cases, the mode conversion optics may include mode converters etched directly into the waveguides.

In some embodiments, the optical coupling 104 may include a mirror array with a plurality of mirrors. Each of the mirrors in the mirror array may correspond to one of the waveguides 106. Each of the input waveguides 106 in the input waveguide region may have a corresponding mirror in the mirror array. The mirror corresponding to each input waveguide 106 can be angled to direct the input light signal from the input aperture 102 along that input waveguide 106.

In some embodiments, the spectrometry system/device 100 may include a planar spectrometer surface. Each of the input waveguides 106 may be positioned on the spectrometer surface. For example, each input waveguide 106 may be a substantially planar waveguide. Planar waveguides 106 may be etched into the planar spectrometer surface.

Each mirror in the mirror array may also be mounted on the spectrometer surface. Each mirror can be mounted at an angle to the spectrometer surface to direct the input light signal incident on the mirror from the input aperture 102 along the corresponding waveguide 106.

The input aperture 102 may be secured to the spectrometer surface (but there may be a gap between the input aperture 102 and the spectrometer surface) with an aperture output facing towards the surface. The input aperture 102 may direct the input light signal 120 towards the spectrometer surface through the aperture output. Each mirror may re-direct the light that is incident on the spectrometer surface from the aperture output (above the surface) along a waveguide 106 that is substantially in the plane of the spectrometer surface.

For example, the plurality of waveguides 106 may be formed on the surface of a planar waveguide chip. The upper surface of the planar waveguide chip may define the spectrometer surface. The plurality of waveguides 106 can be etched into the surface of the waveguide chip. The mirror array can be secured on the surface of the waveguide chip so that light incident on the surface of the waveguide chip can be re-directed along the waveguides 106.

In some embodiments, the input aperture 102 may include a plurality of lenses. For example, the lenses may be provided using gradient-index (GRIN) lenses. The plurality of lenses may define the input aperture 102. For example, the lenses may be arranged into a grid of lenses.

In some cases, the plurality of lenses may direct the received input signal to a circular bundle of waveguides. The circular bundle of waveguides may then fan-out into an array (e.g. a V-groove array) matched to the spacing of the input waveguide region. This may provide input coupling between the input aperture 102 and the plurality of waveguides 106.

In embodiments using a micro-mirror array, the circular bundle of waveguides may not be required. The plurality of lenses can include a lens corresponding to each of the mirrors in the mirror array. Each lens can be used to direct the input light signal 120 toward the corresponding mirror in the mirror array. That mirror may then re-direct the light signal from the corresponding lens along the corresponding waveguide 106.

The plurality of waveguides 106 may be spatially distributed or arrayed. Similarly, the mirrors in the mirror array can be spatially distributed so as to be aligned with the corresponding waveguides 106. As a result, there may be gaps between neighboring mirrors in the mirror array. The plurality of lenses in the input aperture 102 can be arranged to direct substantially all of the input light signal 120 to the mirrors in the mirror array (and in turn to the waveguides 106). That is, the lenses in the plurality of lenses may be directed and focused to avoid directing the input light signal 120 towards the gaps between mirrors in the mirror array.

The mirror array may be provided as a circular array of micro-mirrors directly etched into the surface of the spectrometer chip. The mirrors can be positioned and angled to direct the received input signal from the back focus of the plurality of lenses into plurality of waveguides 106 on the chip.

The angle of the mirrors may be adjusted based on the angle of the incident light from the input aperture 102. For example, where the input aperture 102 is placed directly above the spectrometer surface (i.e. the input light signal 120 is directed towards the spectrometer surface substantially perpendicular to the plane of the spectrometer surface), the mirrors may be angled at approximately 45 degrees to direct the received input signal along the waveguides 106.

As mentioned, the plurality of lenses can be focused to direct the received light signal 120 into the waveguides 106. The back focal point of each lens may be focused to coincide with the corresponding waveguide 106 after reflection by the corresponding mirror in the mirror array. The f-number of the lenses in the plurality of lenses can be matched to the acceptance cones of the waveguides 106 as defined by their numerical aperture. Each lens may focus a portion of the received light signal into the corresponding waveguide 106.

The plurality of lenses may be provided as a single component. For example, the plurality of lenses may be provided as a micro-lens array. Similarly, the plurality of waveguides 106 can be provided on the spectrometer surface/chip as a single component. The plurality of lenses may be aligned so the focal point of each lens (after reflection by the mirrors in the mirror array) is focused on a corresponding waveguide 106. The plurality of lenses may then be secured to the spectrometer in the aligned position.

For example, an adhesive layer may be applied between the plurality of lenses (e.g. the micro-lens array) and the spectrometer surface. In some cases, the adhesive layer may be a ball-loaded adhesive to maintain a uniform adhesive layer thickness. A test light signal can be directed through the plurality of lenses, and the position of the lenses can be adjusted while monitoring output light from each waveguide 106. When light is detected from all of the waveguides, the adhesive layer can be set.

It should be understood that spectrometer system/device 100 is merely exemplary, and a spectrometer device 100 may include various additional components not shown in FIG. 1. For instance, the spectrometer 100 may include various user interface components such as input devices, output devices, display devices etc. The spectrometer 100 may also include various communication components that may permit transmission and reception of control commands and data between the spectrometer 100 and other devices, e.g. using wired or wireless communication protocols.

In some embodiments, a multi-unit spectrometry device/system may be provided. The multi-unit spectrometer may include two or more spectrometry devices such as those shown by system 100.

In some cases, the spectrometry devices may be substantially identical (i.e. reconstructing an emitted spectrum over the same bandwidth and spectral resolution. The discrete interference patterns (and corresponding reconstructed emitted signal) may then be used as independent results to improve the signal to noise ratio of the spectrometer.

A multi-unit spectrometer may be used to improve the time-resolution of spectrometer system 100. For example, each spectrometry device in the multi-unit spectrometer may have an associated signal collection time. The signal collection time for each spectrometry device in the multi-unit spectrometer may be different (i.e. the signals collected by the spectrometry devices in the multi-unit spectrometer may be offset in time). The multi-unit spectrometer may then collect multiple input signals (and corresponding discrete interference patterns) in the span of a single data collection period. This may provide improved time resolution of the reconstructed emitted spectra. This may also facilitate the measurement and observation of processes that occur rapidly and may otherwise have emissions that occur outside the collection time of a single-unit spectrometer.

In some cases, the spectrometry devices in the multi-unit spectrometer may be different. Each spectrometry device in a multi-unit spectrometer may have a different bandwidth. For example, each spectrometry device in the multi-unit spectrometer may collect signals corresponding to a portion of a bandwidth of interest. The plurality of spectrometry devices in the multi-unit spectrometer may then combine to provide a multi-unit spectrometer with expanded bandwidth and/or improved resolution.

In some cases, the spectrometry system 100 may require an initial calibration. One technique to calibrate the spectrometry system 100 can include experimentally determining the DCT matrix corresponding to Equation (2). This DCT matrix can be experimentally determined using a tunable laser. Monochromatic light of a known wavenumber can be used as the input to the device. The output of each interferometer 110 can be detected and stored as the tunable laser is swept across the full spectral range of the spectrometer 100. The stored outputs can then be used to determine the DCT matrix.

Figure 2:
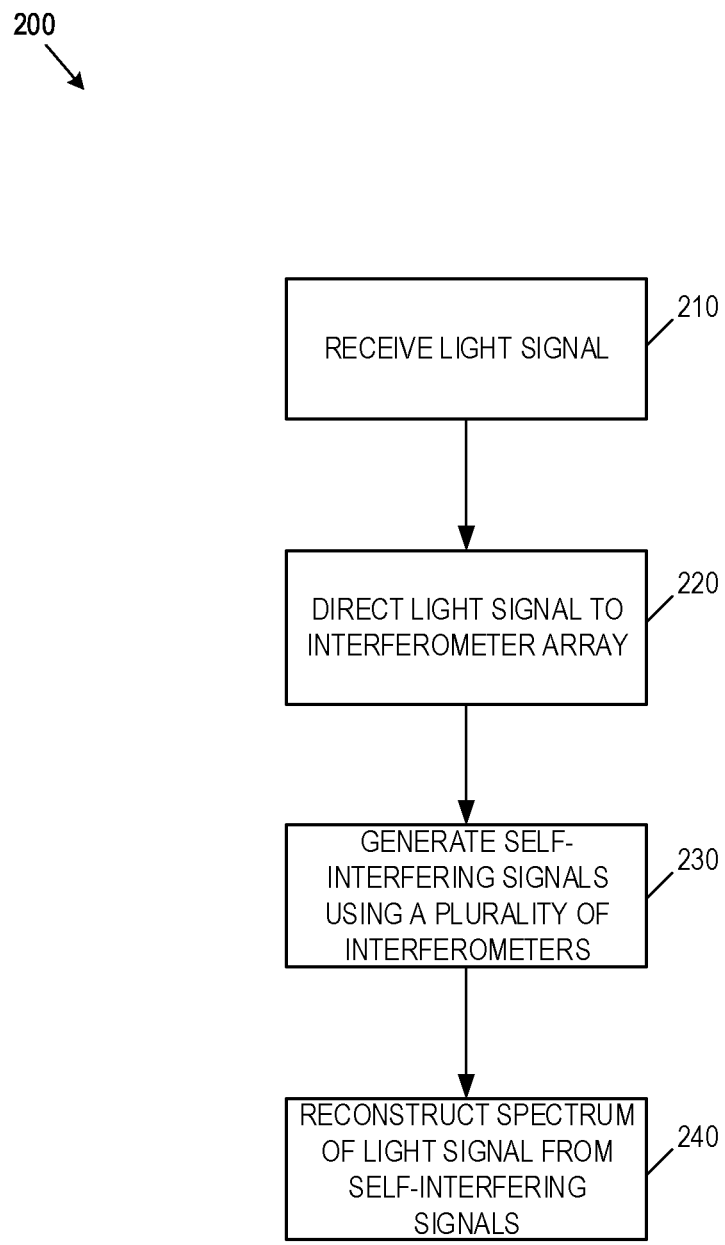
FIG. 2 illustrates an example of a process for determining an emitted light spectrum in accordance with an example embodiment.

Referring now to FIG. 2, shown therein is an example process 200 for determining an emitted spectrum from an input light signal in accordance with an example embodiment. Process 200 may be used to determine an emitted spectrum having a spectral bandwidth B and a spectral resolution $\Delta\lambda$. Process 200 is an example of a process that may be used to reconstruct an emitted spectrum with fewer samples than would be required by the Nyquist criterion. Process 200 may be implemented using a spectrometry device or system such as spectrometer 100.

At 210, an input light signal can be received by the spectrometer. The input light signal may typically be received from a location or sample of interest, such as sample 126. The input light signal may be received by an aperture, such as aperture 102.

The input light signal may include scattered signal components emitted in response to an excitation light signal or pulse (e.g. light pulse 124 from a light source such as light source 118). For example, the input light signal may include Raman scattering signal components emitted by a sample of interest in response to a laser light pulse.

At 220, the input light signal received at 210 may be directed to an array of interferometers such as array 108. For example, the input light signal may be directed along a plurality of waveguides (e.g. waveguides 106) leading to the array of interferometers.

As explained above, the input light signal may be coupled, e.g. using various optical components such as aperture 102 and optical coupling 104 described herein above.

At 230, a plurality of self-interfering signal can be detected from the array of interferometers, e.g. using a detector array such as detector array 112. The plurality of self-interfering signals may be detected substantially simultaneously or concurrently. The plurality of self-interfering signals can include a first plurality of self-interfering signals from a first plurality of interferometers in the interferometer array.

The number of self-interfering signals in the first plurality of self-interfering signals can be fewer than the number of samples required to satisfy the Nyquist criterion to reconstruct the emitted spectrum (with spectral bandwidth B and spectral resolution $\Delta\lambda$). As explained above, the number of self-interfering signals may be determined based on the undersampling coefficient of a particular compressive sensing process in the same manner as determining the number of interferometers required.

In some cases, the number of self-interfering signals in the plurality of self-interfering signals can be equal to or less than half the number of samples required to satisfy the Nyquist criterion for the spectrum of the input light signal. In some cases, the number of self-interfering signals in the plurality of self-interfering signals can be equal to or less than ¼ the number of samples required to satisfy the Nyquist criterion for the spectrum of the input light signal.

The array of interferometers can include a first plurality of interferometers with known phase shifts. The phase shifts of the interferometers in the first plurality of interferometers may all be different. As explained herein above, the first plurality of interferometers can include fewer, and often substantially fewer, interferometers than would be required to satisfy the Nyquist criterion. The number and phase shifts of the interferometers in the first plurality of interferometers may be determined based on the spectral bandwidth B, the spectral resolution $\Delta\lambda$ and an undersampling coefficient as described above.

At 240, the emitted light spectrum can be reconstructed from the plurality of self-interfering signals detected at 230. The emitted light spectrum may be reconstructed using compressive sensing.

A discrete interference pattern may be determined from the plurality of self-interfering signals detected at 230. The emitted light spectrum may be reconstructed from the discrete interference pattern. Reconstruction of the emitted light spectrum using compressive sensing may involve a minimization process.

At least one potential emitted spectrum may be identified. Typically, a plurality of potential emitted spectra can be identified. A distance value can be determined for each potential emitted spectrum. The distance value can be determined based on the discrete interference pattern and defined signal acquisition properties of the spectrometer. For example, the distance value may be determined using a rectilinear distance or $l_1$-norm.

The spectrometer may have defined signal acquisition properties indicating how an input signal may be transformed and sampled during a data collection process. Such signal acquisition properties may be pre-defined for the spectrometer. In some cases, the signal acquisition properties may be determined during an initial calibration process. In general, however, the signal acquisition properties for the spectrometer can be pre-defined for the acquisition of a particular input signal at the time of acquisition of that input signal.

A lowest distance potential emitted spectrum can be identified. The lowest distance potential emitted spectrum can be identified as the potential emitted spectrum corresponding to the lowest distance value. The lowest distance potential emitted spectrum may be identified as part of a process for minimizing the $l_1$-norm. The emitted light spectrum may then be reconstructed as the lowest distance potential emitted spectrum.

The output from the plurality of self-interfering signals (i.e. the discrete interference pattern) can correspond to samples y of the representation of the input signal in the cosine transformation basis. Signal acquisition parameters of the spectrometer, such as the cosine transformation basis matrix $\Psi$ and the sensing matrix $\Phi$ can be defined.

A theoretical or potential cosine transformation basis matrix $\Psi$ may be defined by the phase shifts of the interferometers used to generate the self-interfering signals. In some cases, the cosine transformation basis matrix $\Psi$ can be determined in an initial calibration of the device. In an initial calibration, the phase-shift of each interferometer can be determined either individually or in parallel. In some cases, the phase shifts defining the cosine transform matrix $\Psi$ may vary with temperature. The temperature of the spectrometer may be determined at the time of measurement and used to determine correction factors. The correction factors can be used to adjust the reconstruction of the emitted spectrum to account for changes in interferometer phase shifts. For example, the correction factors may be determined using a detected reference laser signal of known wavelength as explained herein.

The sensing matrix $\Phi$ can be determined from the phase shifts of the interferometers in the first plurality of interferometers. In general, the sensing matrix $\Phi$ acts on the cosine transformation matrix to "select" or identify the components of the cosine transform that are actually measured/detected. In some cases, variations in coupling efficiency may provide non-uniform illumination and throughput. These variations can be calibrated initially and may be incorporated into the sensing matrix.

Using the output from the plurality of self-interfering signals and signal acquisition parameters of the spectrometer, the emitted light spectrum can be determined or reconstructed using a minimization process to solve Equation (9) set out above. Minimizing the $l_1$-norm can provide a stable solution to Equation (9), as discussed above.

In some cases, the input light signal received at 210 may be a sparse signal. In such cases, method 200 may proceed directly from 230 to 240 reconstruct the emitted light spectrum. However, in some cases the input signal may not be sparse (e.g. it may be contaminated by background light or fluorescence). In such cases, a pre-processing process, such as method 300 described below may be used to pre-process the discrete interference pattern prior to reconstructing the emitted light spectrum.

In some cases, additional pre-processing may also be performed prior to reconstructing the emitted light spectrum at 240. For example, the additional pre-processing may include the removal of signal components corresponding to detector artifacts, dark current, gain non-linearities and the like.

A pre-processed discrete interference pattern may then be generated. The emitted light spectrum can be reconstructed from the pre-processed discrete interference pattern. For example, rather than using the discrete interference pattern in the reconstruction process described at 240 above, the pre-processed discrete interference pattern can be used in its place. This may provide a sparse signal that may be more likely to result in an accurate reconstruction of the emitted light spectrum, even in the presence of other contaminating signal components.

Figure 3:
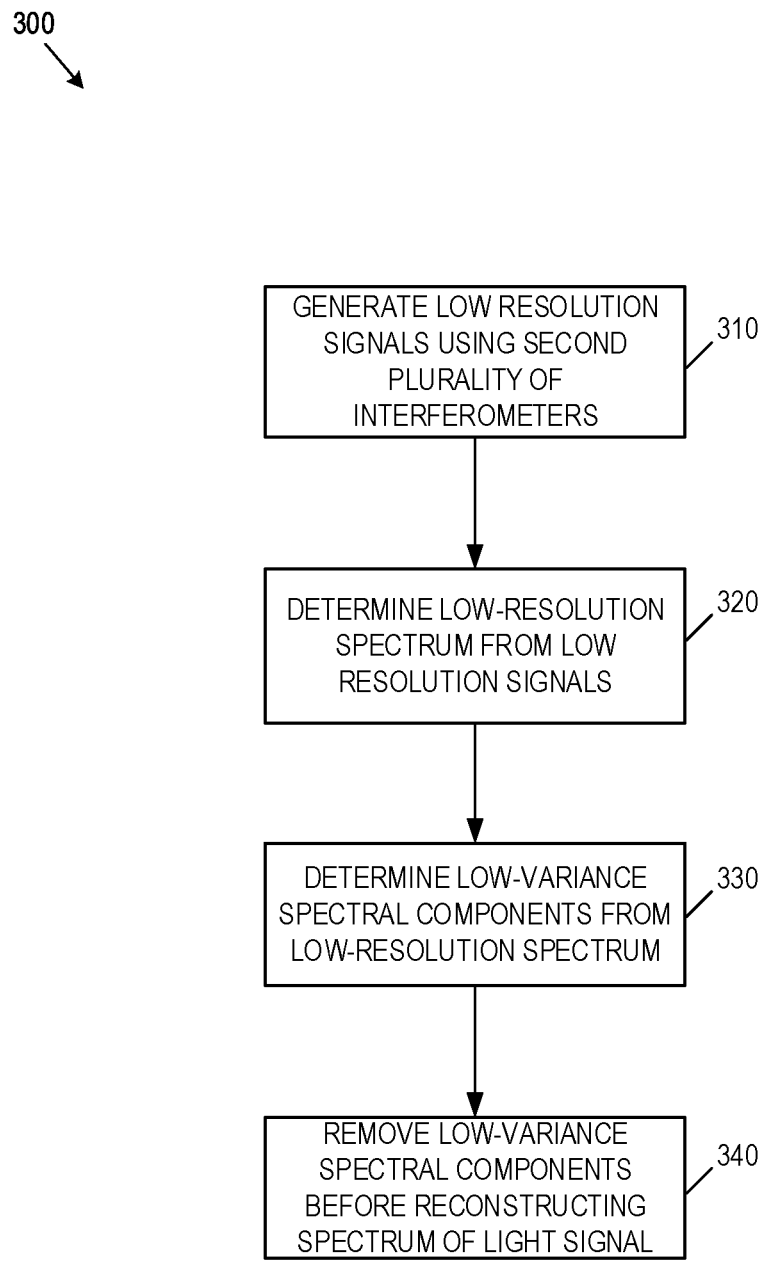
FIG. 3 illustrates an example of a process for removing low-resolution signal components in accordance with an example embodiment.

Referring now to FIG. 3, shown therein is an example process 300 that can be used to generate a pre-processed discrete interference pattern. Process 300 may be used to remove signal components to provide a sparse signal for reconstruction using compressive sensing. Process 300 may remove signal components that may be considered to contaminate the emitted light spectrum of interest, such as background or fluorescent signals. Process 300 may be implemented using a spectrometer system or device such as spectrometer 100.

At 310, a second plurality of self-interfering signals can be detected. The second plurality of self-interfering signals can be detected from the outputs of a second plurality of interferometers in the array of interferometers. The second plurality of self-interfering signals may be detected substantially simultaneously or concurrently.

The second plurality of self-interfering signals may correspond to samples of the same spectral bandwidth B as the first plurality of self-interfering signals, but with a lower spectral resolution $\Delta\lambda_{low}$. The second plurality of self-interfering signals may provide a fully Nyquist sampled set of low-resolution samples for the spectral bandwidth B. Typically, the number of self-interfering signals in the second plurality of self-interfering signals can be lower than the number of signals in the first plurality of self-interfering signals (e.g. 50%, 25% or even 10%).

The second plurality of self-interfering signals may be generated using embodiments of the second plurality of interferometers described herein above. For example, the number and phase shifts of the interferometers in the second plurality of interferometers can be selected to provide a fully Nyquist sampled set of low-resolution samples.

At 320, a low resolution spectrum of the input light signal may be determined from the second plurality of self-interfering signals detected at 310. The low resolution spectrum may represent a reconstruction of the input light signal with the spectral bandwidth B and a spectral resolution of $\Delta\lambda_{low}$. The low-resolution spectrum may be reconstructed by applying a Fourier transform to the second plurality of self-interfering signals detected at 310.

In some cases, a low-resolution spectrum reconstructed using all the self-interfering signals in the second plurality of self-interfering signals may incorporate some signal components that may be of interest for reconstruction of the input signal spectrum. For instance, where the input light signal has a simple, consistent background/contaminant signal component some of the self-interfering signals may include Raman signal components.

Accordingly, in some embodiments the low-resolution spectrum may be reconstructed using only a subset of the self-interfering signals in the second plurality of self-interfering signals. This may avoid excluding some of the emitted signal components of interest that may be detected in the full set of self-interfering signals in the second plurality of self-interfering signals.

A first low-resolution spectrum may be reconstructed using all the self-interfering signals in the second plurality of self-interfering signals. A second low-resolution spectrum may also be reconstructed using a subset of the self-interfering signals in the second plurality of self-interfering signals. For example, where the second plurality of self-interfering signals includes 40 low-resolution self-interfering signals, the second low-resolution spectrum may be reconstructed using only 10 of those low-resolution self-interfering signals.

The first low-resolution spectrum and second low-resolution spectrum may be compared to determine a low-resolution spectrum difference. Based on the low-resolution spectrum difference, the first low-resolution spectrum and second low-resolution spectrum may be selected as the low-resolution spectrum.

In general, the low-resolution spectrum may contain information from Raman peaks of interest. In the low-resolution spectrum this effect can manifest as spectral leakage components. For example, spectral leakage components from a single Raman peak can manifest as a sinc function overlaid on top of the broadband spectrum. Such spectral leakage components may be identified in various ways.

For example, an initial emitted spectrum may be determined (i.e. via compressive-sensing retrieval) after subtracting the low-resolution spectral components corresponding to a first low-resolution spectrum (which may contain the aforementioned distortions caused by spectral leakage). The initial emitted spectrum may include an initial plurality of negative components. Such negative components may represent compensation by the compressive sensing process for the spectral leakage components. A negative component threshold may be defined to determine that the initial emitted spectrum may be suitable for reconstruction while subtracting fewer low-resolution spectral components.

For example, the negative component threshold may be defined based on a ratio of the minimum (or maximally negative) reconstructed signal component in the initial emitted spectrum to the standard deviation of the initial emitted spectrum. If ratio of the minimum (or maximally negative) reconstructed signal component in the initial emitted spectrum to the standard deviation of the initial emitted spectrum is greater than the negative component threshold, it can be determined that fewer low-resolution spectral components should be subtracted, and a subsequent emitted spectrum may be reconstructed with fewer low-resolution spectral components subtracted. This process may be repeated iteratively until the negative component threshold is satisfied.

In another example, the local maxima of the spectral leakage components (e.g. sinc function) may overlap with Raman components in an initial reconstructed emitted spectrum. This may occur because strong Raman components can cause the spectral leakage components. The local maxima of the spectral leakage components can be identified (e.g. using a "findpeaks" routine in MATLAB). A peak overlap threshold can be defined to identify reconstructed emitted spectra with multiple local maxima in the low-resolution spectrum that overlap with the highest intensity emitted components in the reconstructed emitted spectrum. Such reconstructed emitted spectra can be flagged for reconstruction with fewer low-resolution spectral components subtracted.

At 330, low-resolution spectral components can be identified from the low resolution spectrum determined at 320. For example, the entire low-resolution spectrum may be used to define the plurality of low-resolution spectral components.

As mentioned, the input light signal may be contaminated with signals such as fluorescence, Planck emissions and other background signals. Such signals may tend to be slowly-varying. Accordingly, such signal components may be identifiable by the low-resolution spectrum.

In contrast, emitted signal components of interest such as Raman spectral signals for example tend to have a few, separated peaks. These spectral signal components may thus not be identified in the low-resolution spectrum determined at 320.

At 340, a pre-processed discrete interference pattern can be generated. The pre-processed discrete interference pattern may be generated by removing the low-resolution spectral components identified at 330 from the discrete interference pattern.

The low-resolution spectral components may be determined using the discrete cosine transform at the phase shift of each interferometer in the array. In other words, equation (2) set out above can be used to determine low-resolution spectral components corresponding to the self-interfering signals output from each interferometer in the first plurality of interferometers by substituting the determined low-resolution spectrum for $p^{in}(\sigma)$, and substituting the phase shift of each interferometer for $2\pi n_{eff}L_i$. These low-resolution spectral components can then be subtracted from the self-interfering signals detected from each interferometer in the first plurality of interferometers to provide pre-processed self-interfering signals. A pre-processed discrete interference pattern can be determined from the pre-processed self-interfering signals.

In some cases, the spectrum of the input signal may be considered as a linear combination of background or low-resolution components indicated by b and emitted signal components of interest, such as Raman components, indicated by r (see, for example, FIG. 4 below). For example, the spectrum of an input signal s may be represented according to Equation (11):

$$s = b + r \quad (11)$$

The first plurality of self-interfering signals (e.g. the self-interfering signals output by the first plurality of interferometers) may be considered to correspond to the cosine transform of the data given by:

$$F(i) = \delta\sigma \Sigma_{k=1}^{\Delta\bar{\sigma}/\delta\bar{\sigma}} s(\sigma)\cos(2\pi\sigma n_{eff}L_i) \quad (12)$$

$$= \delta\sigma \Sigma_{k=1}^{\Delta\bar{\sigma}/\delta\bar{\sigma}} [b(\sigma) + r(\sigma)] \cos(2\pi\sigma n_{eff}L_i) \quad (13)$$

$$= \delta\sigma \Sigma_{k=1}^{\Delta\bar{\sigma}/\delta\bar{\sigma}} b(\sigma)\cos(2\pi\sigma n_{eff}L_i) + \delta\sigma \Sigma_{k=1}^{\Delta\bar{\sigma}/\delta} \bar{\sigma} r(\sigma)\cos(2\pi\sigma n_{eff}L_i) \quad (14)$$

An initial low-resolution or background signal spectrum b' can be determined from the second plurality of self-interfering signals (e.g. the self-interfering signals output by the second plurality of interferometers) by:

$$p(\sigma') = \frac{2\delta Ln_{eff}}{N} \Sigma F(i)\cos(2\pi\sigma' n_{eff}L_i) \quad (15)$$

where σ' indicates that the resolution of b' is much lower than that of r.

The initial low-resolution or background signal spectrum b' may also be determined by inverting a different discrete cosine transform matrix, Ψ', corresponding to the phase shifts of the interferometers in the second plurality of interferometers.

The initial low-resolution or background signal spectrum b' may then be smoothed to provide a smoothed low-resolution spectrum b. The smoothed low-resolution spectrum b may have a comparable resolution to r and s, although it generated using low-resolution sampling. The smoothed low-resolution spectrum may be referred to as a background spectrum or slowly-varying spectrum (similarly, the initial low-resolution spectrum may be referred to as an initial background spectrum or an initial slowly-varying spectrum). For example, the initial low-resolution spectrum b' may be curvefitted to a sum of sines to provide the smoothed low-resolution spectrum b. Alternatively, interpolation may be used to smooth the initial low-resolution spectrum b' to provide the smoothed low-resolution spectrum b.

The low-resolution spectral signal components F'(i) of the spectrum b, may then be obtained by substituting b for p in equation (2). These components may then be subtracted from the first plurality of self-interfering signals F(i) in equation (12) to provide a first plurality of pre-processed self-interfering signals. The first plurality of pre-processed self-interfering signals may then correspond primarily to the emitted signal components of interest r (such as Raman components, Laser-induced breakdown spectroscopy (LIBS) emissions, atomic emissions, molecular emissions and the like). A pre-processed discrete interference pattern may then be determined from the first plurality of pre-processed self-interfering signals.

The pre-processed discrete interference pattern may then be used to reconstruct the emitted light spectrum. The pre-processed discrete interference pattern can be used to reconstruct the emitted light spectrum as explained herein above, for example in relation to step 240 of process 200.

In some cases, a source spectral component may be identified in the reconstructed emitted light spectrum. The source spectral component may correspond to the wavelength of an emitted light signal from a light source with a known wavelength. That is, the source spectral component may be identified at a wavelength position near to the known wavelength of the light source.

The source spectral component may represent a portion of the excitation laser signal. The source spectral component may be used to identify and calibrate thermo-optical shifts of the spectrometer. This may provide improved robustness of the spectrometer with respect to its local environment.

In some cases, the source spectral component may be identified at a wavelength position different from the known wavelength of the light source. For example, the source spectral component may be expected to be 532 nm but may be identified at 534 nm. This may indicate the presence of a thermo-optic shift in the spectrometer.

At least one correction factor may be determined based on the identified source spectral component and the known wavelength of the emitted light signal. The at least one correction factor may include a plurality of correction factors, with one correction factor for each interferometer in the interferometer array. The correction factor may be determined based on a thermo-optic coefficient of the waveguide material used to implement the interferometers in the interferometer array. The correction factor may also be determined taking into account the actual optical path for each interferometer.

The at least one correction factor may be used to adjust the reconstructed emitted light spectrum. The correction factors may be used to adjust or correct the signal acquisition properties of the spectrometer. The adjusted signal acquisition properties may then be used to perform the reconstruction of the emitted light spectrum. For instance, the phase shifts associated with each interferometer (and in turn the cosine transformation matrix) may be adjusted based on the corresponding correction factor.

Figure 4:
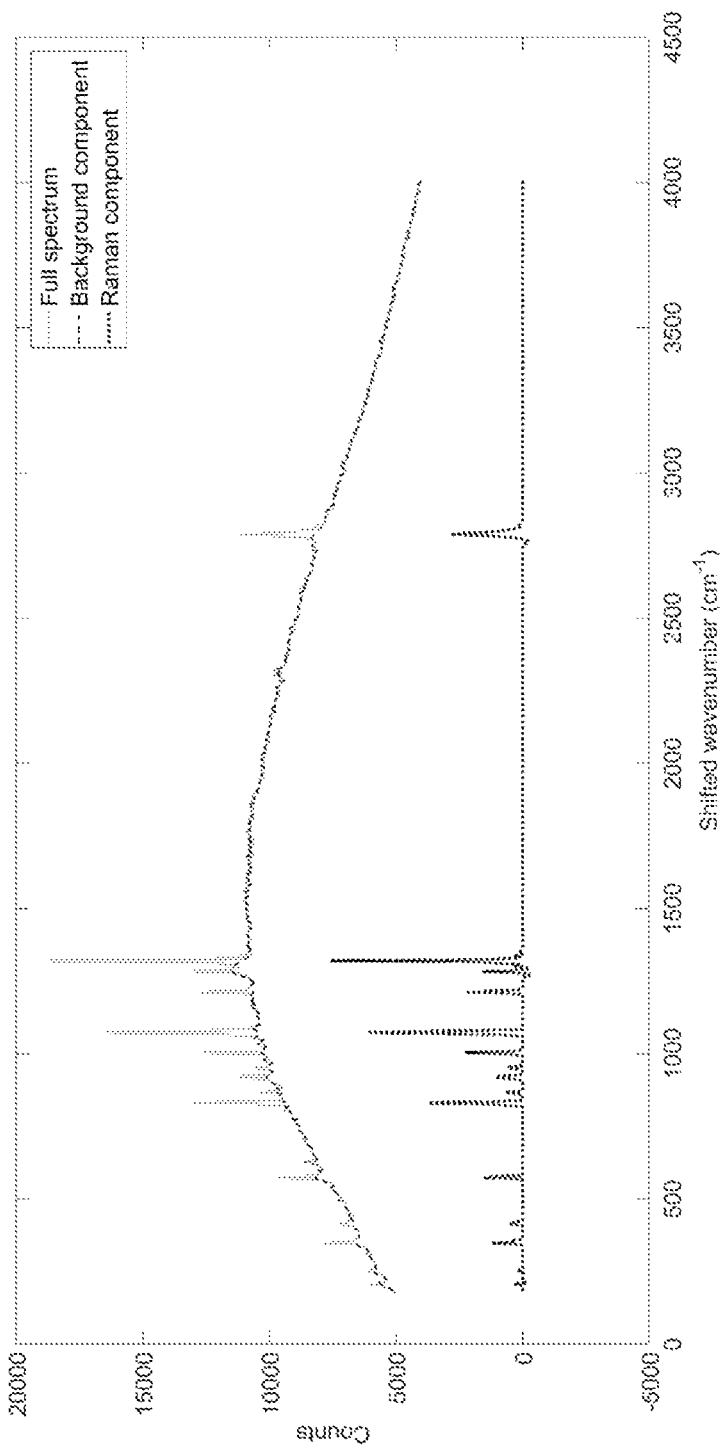
FIG. 4 illustrates a graph plotting an example of an input signal spectrum.

Referring now to FIG. 4, shown therein is an example graph plotting an input light spectrum. The input light spectrum shown in FIG. 4 was generated experimentally. The input light spectrum was then analyzed using an instrument model of a Raman waveguide spectrometer designed in accordance with embodiments described herein.

As shown in FIG. 4, the spectrum of the input signal may be decomposed into Raman signal components and background or broadband signal components (which may correspond to a low-resolution spectrum).

The background signal components shown in FIG. 4 were determined using a spline fit, with Raman components identified and removed manually. As FIG. 4 illustrates, the spectrum of an input signal may be considered a linear combination of broadband "background" signal components and sparse Raman signal components.

Figure 5:
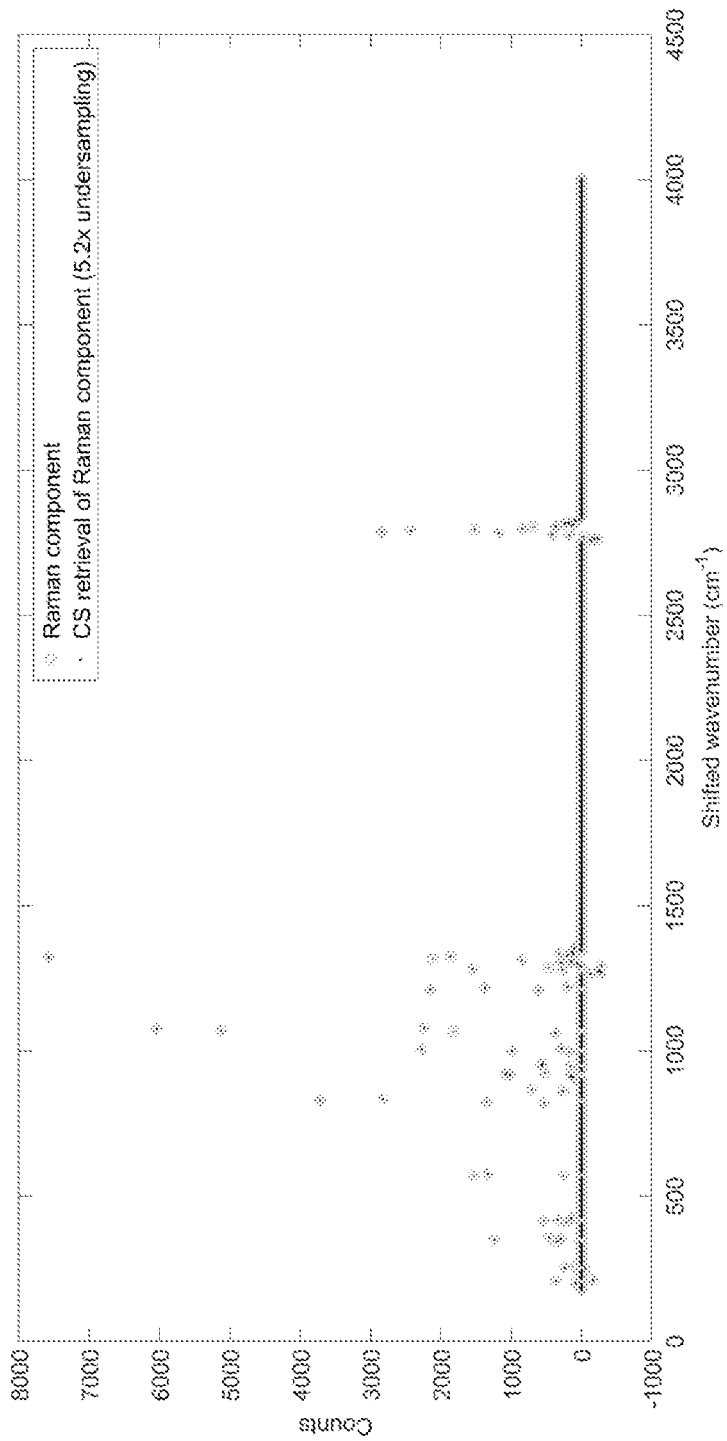
FIG. 5 illustrates a graph plotting an example of Raman spectral signal components of the input signal spectrum of FIG. 4.

Referring now to FIG. 5, shown therein is an example graph plotting Raman signal components from the input light spectrum shown in FIG. 4. The graph shown in FIG. 5 also illustrates the determination of the Raman signal components from the Raman spectrum shown in FIG. 4 using a compressive sensing process.

The compressive sensing process used in the instrument model to determine the reconstructed Raman signal components in FIG. 5 had an undersampling rate of 5.2× (undersampling coefficient of 1/5.2), meaning that 5.2× fewer samples were required to identify the reconstructed Raman signal components than the Nyquist criterion would require. As FIG. 5 illustrates, by removing a low-resolution or background spectrum from the input signal, the resulting pre-processed signal is a sparse signal that is appropriate for reconstruction using compressive sensing.

Figure 6:
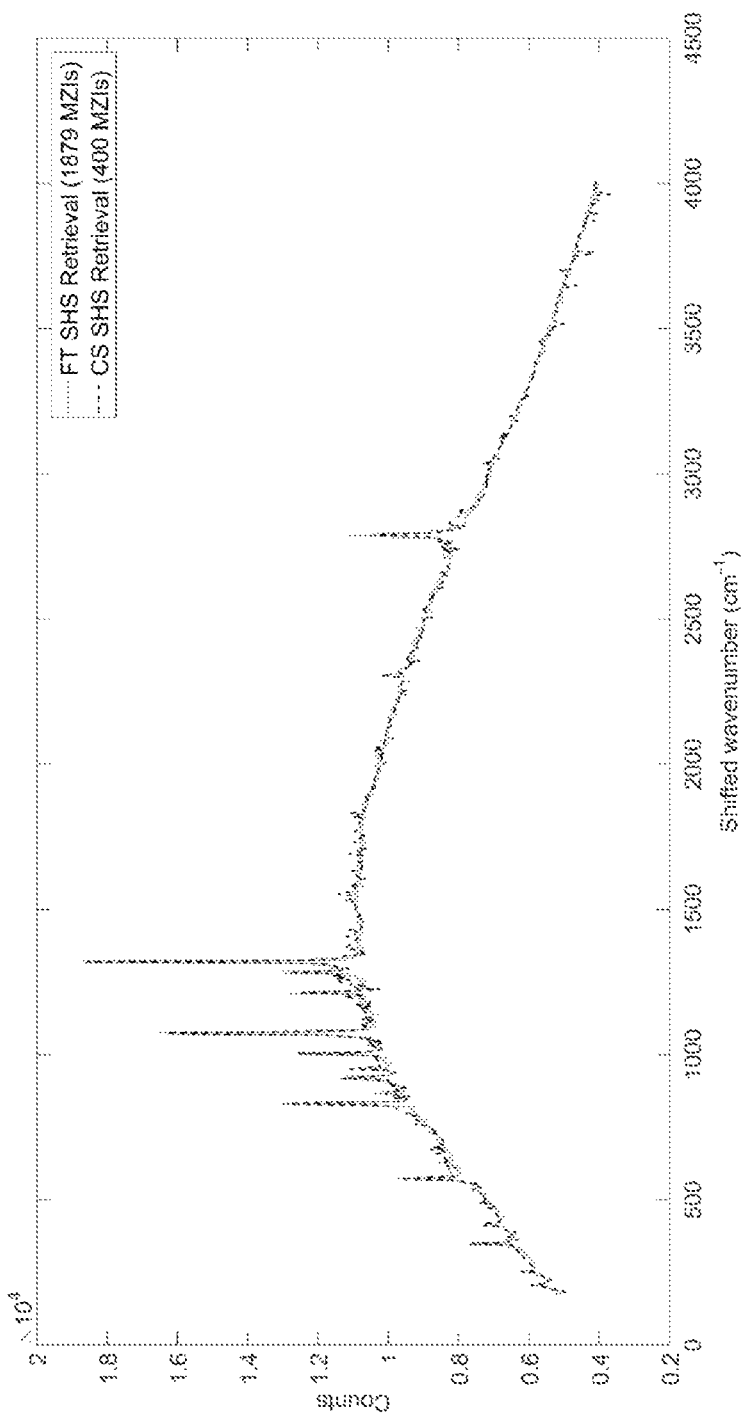
FIG. 6 illustrates a graph plotting example reconstructions of the emitted light spectrum of FIG. 4.

Referring now to FIG. 6, shown therein is a graph plotting an example reconstruction from the input signal spectrum of FIG. 4 according to the Nyquist criterion (using 1879 Mach-Zehnder interferometers) and an example reconstruction from the input signal spectrum of FIG. 4 using sub-Nyquist sampling (400 Mach-Zehnder interferometers) in a compressive sensing process in accordance with an example embodiment.

In the reconstruction shown in FIG. 6, the low-resolution or background spectrum was removed using an example embodiment of the process 300 for pre-processing the input signal described herein. In the instrument model used to reconstruct the input signal spectrum in a compressive sensing process in accordance with an example embodiment, the first plurality of interferometers included 360 interferometers while the second plurality of interferometers included 40 interferometers. In other words, the low-resolution spectrum (used to determine the low-resolution spectral components to be removed) was determined based on self-interfering signals from 40 interferometers. The plurality of self-interfering signals used to reconstruct the emitted signal spectrum had self-interfering signals from 360 interferometers.

As shown by FIG. 6, in embodiments described herein the emitted light spectrum may be reconstructed using substantially fewer interferometers (400 vs. 1879) while generating a reconstructed spectrum with good accuracy, i.e. a low error level. In the example reconstruction shown in FIG. 6 in accordance with embodiments described herein, a normalized root mean square error of 1.12% was achieved.

Figure 7:
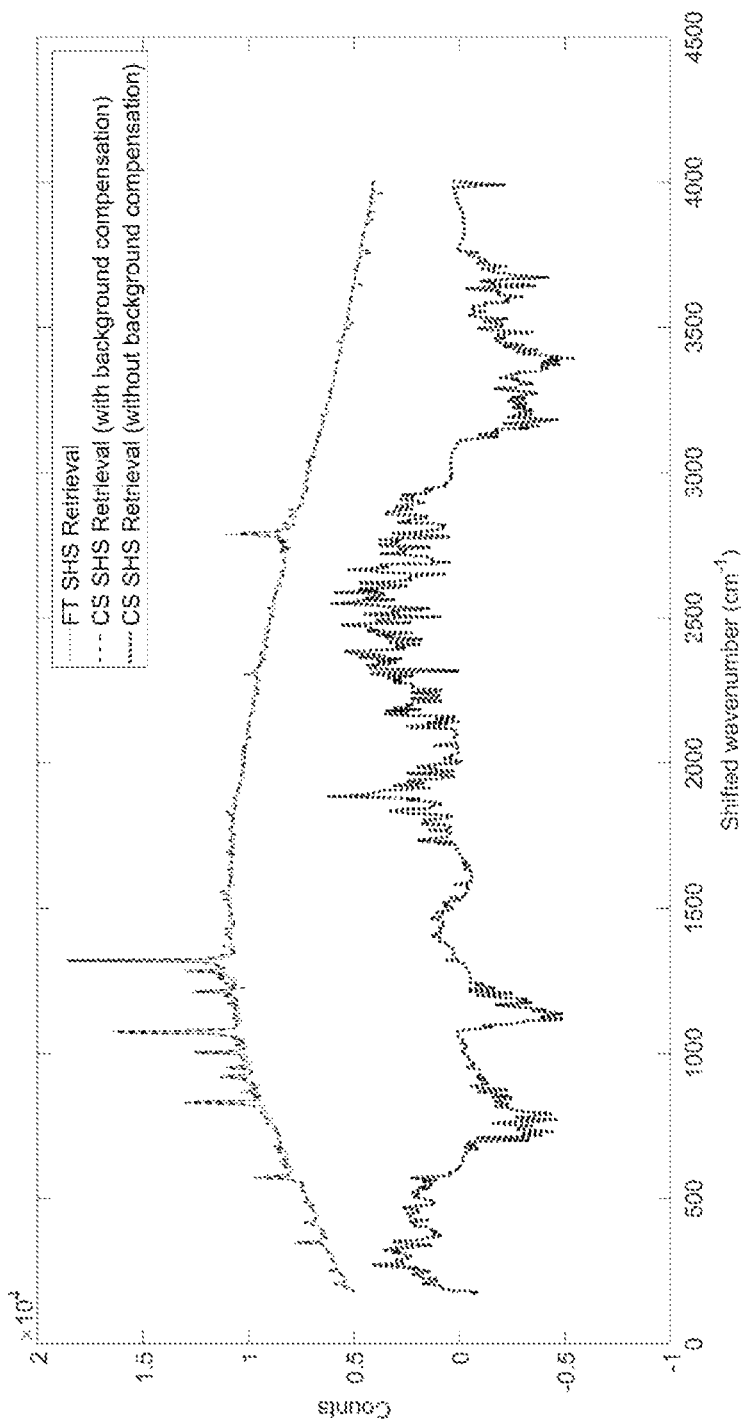
FIG. 7 illustrates another graph plotting further example reconstructions of the emitted light spectrum of FIG. 4.

Referring now to FIG. 7, shown therein is another graph plotting the example reconstructions shown in FIG. 6 as well as an example reconstruction from the input signal without removal of the low-resolution or background spectrum. As FIG. 7 demonstrates, if the background or low-resolution signal components are not removed the compressive sensing process may not provide an accurate reconstruction of the emitted light spectrum. However, once the background or low-resolution signal components are removed using an embodiment of the process 300, the emitted light spectrum can be reconstructed accurately with substantially fewer interferometers than would be required by the Nyquist criterion.

Figure 8:
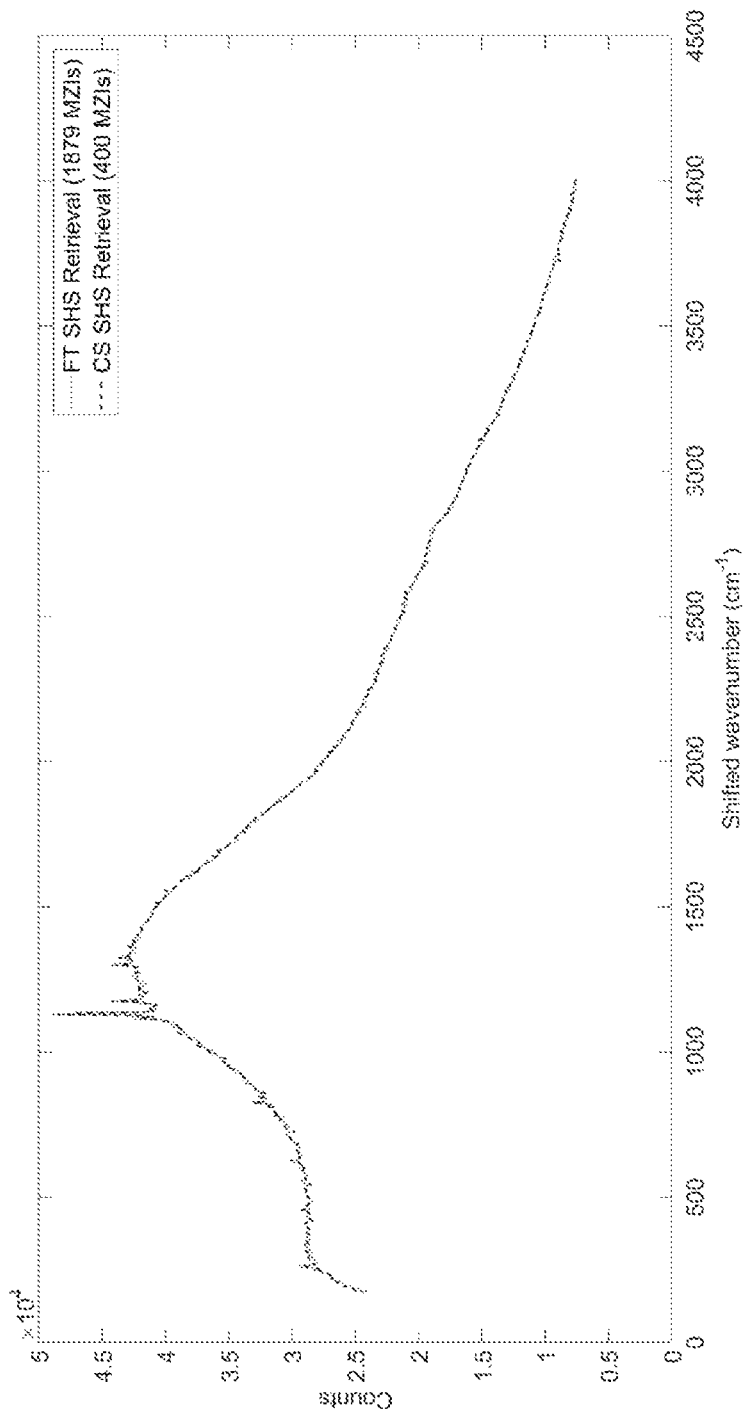
FIG. 8 illustrates a graph plotting example reconstructions of a second emitted light spectrum.

Referring now to FIG. 8, shown therein is a graph plotting an example reconstruction from a second input signal spectrum according to the Nyquist criterion (using 1879 Mach-Zehnder interferometers) and an example reconstruction from the second input signal spectrum using sub-Nyquist sampling (400 Mach-Zehnder interferometers) in a compressive sensing process in accordance with an example embodiment. In the example shown in FIG. 8, the compressive sensing process has an undersampling rate of 4.7 (or undersampling coefficient of 1/4.7)

The second input signal spectrum includes Raman signal components as well as a more complex or varied low-resolution/background spectrum as compared to the input signal spectrum of FIG. 4. Nonetheless, the reconstruction of the emitted light spectrum using an example of an embodiment described herein with pre-processing to remove low-resolution signal components provides an accurate, i.e. low-error reconstruction. In the example reconstruction shown in FIG. 8 in accordance with embodiments described herein, a normalized root mean square error of 0.38% was achieved.

Figure 9:
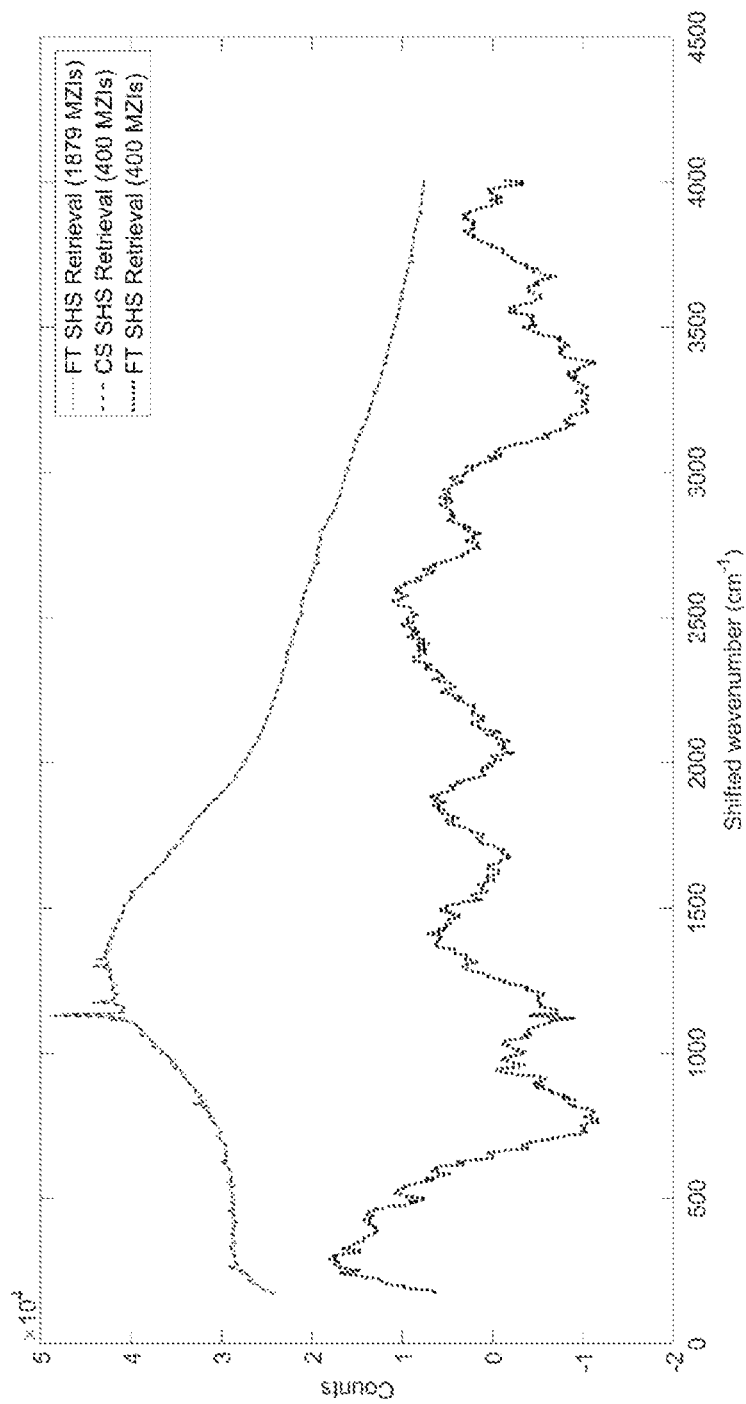
FIG. 9 illustrates another graph plotting example reconstructions of the second emitted light spectrum.

Referring now to FIG. 9, shown therein is an example graph plotting the reconstructions shown in FIG. 8 as well as a conventional reconstruction using only 400 Mach-Zehnder interferometers. As FIG. 9 illustrates, the emitted light spectrum is not accurately reconstructed using conventional inverse DFT techniques with sub-Nyquist sampling while the reconstruction using an embodiment of the described compressive sensing process provides an accurate reconstruction.

Figure 10:
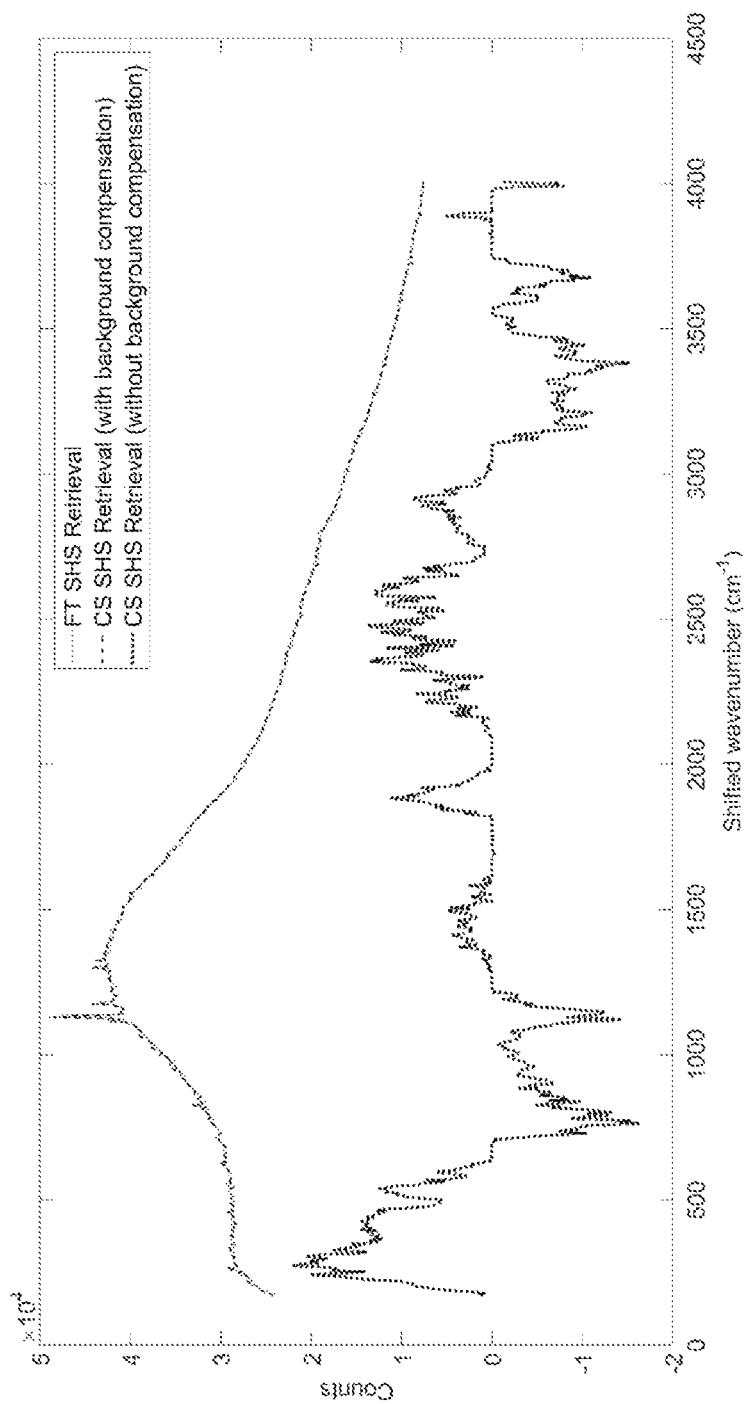
FIG. 10 illustrates a further graph plotting example reconstructions of the second emitted light spectrum.

Referring now to FIG. 10, shown therein is another graph plotting the example reconstructions shown in FIG. 8 as well as an example reconstruction of the input signal without removal of the low-resolution or background spectrum. As FIG. 10 demonstrates, if the background or low-resolution signal components are not removed, the compressive sensing process may not provide an accurate reconstruction of the emitted light spectrum. However, once the background or low-resolution signal components in accordance with an embodiment of the process 300, the emitted light spectrum can be reconstructed accurately with substantially fewer interferometers than would be required by the Nyquist criterion.

Embodiments of the devices, systems and methods described herein may permit reconstruction of an emitted light spectrum using fewer samples than would be required by the Nyquist sampling criterion. Embodiments described herein may thus provide spectrometers using interferometer arrays with fewer interferometers than may otherwise be required. Minimization processes and compressive sensing techniques may be applied to reconstruct the emitted light spectrum from an input light signal with fewer samples where the sampled signal is a sparse signal.

Embodiments described herein may also provide pre-processing of a sampled input light signal to provide a sparse sampled signal. Low-resolution signal components can be identified in the input light signal. The low-resolution signal components can be removed to provide a sparse sampled set suitable for reconstruction using compressive sensing.

Embodiments described herein may also provide optical coupling of an input light signal to a plurality of waveguides. A plurality of lenses may be used to focus the input light signal along the waveguides using a corresponding plurality of mirrors. The plurality of mirrors may be arrayed in the same plane as the waveguides, but angled to reflect the input light signal along the waveguides. Embodiments of the optical coupling may thus provide for accurate distribution of input light signal to the waveguides, while avoiding gaps between adjacent waveguides.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A spectrometer comprising:
    a) an input aperture configured to receive an input light signal;
    b) an array of interferometers, each interferometer having a signal input and a signal output and configured to output a self-interfering signal with a known phase shift, the array including a first plurality of interferometers where the phase shift for each interferometer in the first plurality of interferometers is different from the phase shift of every other interferometer in the first plurality of interferometers;
    c) a plurality of input waveguides optically coupled to the input aperture and to the array of interferometers to receive the input light signal from the input aperture and direct the received light signal to the array of interferometers;
    d) a detector array optically coupled to the array of interferometers to detect a first plurality of self-interfering signals from the first plurality of interferometers, the first plurality of self-interfering signals including the self-interfering signal output by each of the interferometers in the first plurality of interferometers; and
    e) a computer-readable storage medium coupled to the detector array, the computer-readable storage medium configured to store at least one first interferometric output signal based on the first plurality of self-interfering signal detected by the detector array;

wherein,
    the number of interferometers in the first plurality of interferometers is fewer than the number of interferogram samples required to satisfy the Nyquist criterion for reconstructing an emitted light spectrum with a spectral bandwidth B and a spectral resolution $\Delta\lambda$; and
    the interferogram samples required to satisfy the Nyquist criterion for the spectral bandwidth B and spectral resolution $\Delta\lambda$ correspond to a first plurality of Nyquist phase shifts, and for each interferometer in the first plurality of interferometers the phase shift is selected from the first plurality of Nyquist phase shifts to permit reconstruction of the emitted light spectrum with the spectral bandwidth B and the spectral resolution $\Delta\lambda$ from the stored at least one first interferometric output signal using compressive sensing.

2. The spectrometer of claim 1, further comprising a processor coupled to the computer-readable storage medium, the processor configured to:
    a) determine a discrete interference pattern from the first plurality of self-interfering signals detected by the detector array; and
    b) reconstruct the emitted light spectrum from the discrete interference pattern by:
        i) determining a plurality of potential emitted spectra;
        ii) determining a distance value for each of the potential emitted spectra based on the discrete interference pattern and defined signal acquisition parameters of the spectrometer;
        iii) identifying a lowest distance potential emitted spectrum as the potential emitted spectrum from the plurality of potential emitted spectra that corresponds to the lowest distance value; and
        iv) reconstructing the emitted light spectrum as the lowest distance potential emitted spectrum.

3. The spectrometer of claim 2, wherein the processor is configured to reconstruct the emitted light spectrum by:
    a) identifying low-resolution spectral signal components in the discrete interference pattern;
    b) generating a pre-processed discrete interference pattern by removing the low-resolution spectral signal components from the discrete interference pattern; and
    c) reconstructing the emitted light spectrum from the discrete interference pattern using the pre-processed discrete interference pattern.

4. The spectrometer of claim 1, wherein:
    a) the array of interferometers further comprises a second plurality of interferometers, the second plurality of interferometers including fewer interferometers than the first plurality of interferometers;
    b) the detector array is optically coupled to the array of interferometers to detect a second plurality of self-interfering signals from the second plurality of interferometers, the second plurality of self-interfering signals including the self-interfering signal output by each of the interferometers in the second plurality of interferometers; and
    c) the computer-readable storage medium is further configured to store at least one low resolution interferometric output signal based on the second plurality of self-interfering signals;
    wherein
    the number of interferometers in the second plurality of interferometers is not less than the number of interferogram samples required to satisfy the Nyquist criterion for reconstructing a low resolution spectrum of the input light signal, the low resolution spectrum having the spectral bandwidth B and a spectral resolution of $\Delta\lambda_{low}$ where $\Delta\lambda_{low} > 2\Delta\lambda$;

the interferogram samples required to satisfy the Nyquist criterion for the spectral bandwidth B and the spectral resolution of $\Delta\lambda_{low}$ correspond to a second plurality of Nyquist phase shifts, and the phase shifts of the interferometers in the second plurality of interferometers are selected to correspond to the second plurality of Nyquist phase shifts.

5. The spectrometer of claim 4, further comprising a processor coupled to the computer-readable storage medium, the processor configured to:
  a) determine a discrete interference pattern from the first plurality of self-interfering signals detected by the detector array;
  b) determine a low resolution spectrum of the input light signal from the second plurality of self-interfering signals detected by the detector array;
  c) identify low-resolution spectral signal components from the low resolution spectrum;
  d) generate a pre-processed discrete interference pattern by removing the low-resolution spectral signal components from the discrete interference pattern; and
  e) reconstruct the emitted light spectrum from the pre-processed discrete interference pattern.

6. The spectrometer of claim 5, wherein the processor is configured to reconstruct the emitted light spectrum from the pre-processed discrete interference pattern by:
  a) determining a plurality of potential emitted spectra;
  b) determining a distance value for each of the potential emitted spectra based on the pre-processed discrete interference pattern and defined signal acquisition parameters of the spectrometer;
  c) identifying a lowest distance potential emitted spectrum as the potential emitted spectrum from the plurality of potential emitted spectra that corresponds to the lowest distance value; and
  d) reconstruct the emitted light spectrum as the lowest distance potential emitted spectrum.

7. The spectrometer of claim 1, wherein the phase shifts for the first plurality of interferometers are selected randomly from the first plurality of Nyquist phase shifts.

8. The spectrometer of claim 1, wherein:
  a) the optical coupling between the input aperture and the plurality of input waveguides comprises a mirror array having a plurality of mirrors; and
  b) each of the input waveguides has a corresponding mirror in the mirror array where the corresponding mirror is angled to direct a portion of the input light signal from the input aperture along that input waveguide.

9. The spectrometer of claim 8, further comprising a planar spectrometer surface, wherein:
  a) each of the input waveguides is a substantially planar waveguide on the spectrometer surface; and
  b) each mirror in the mirror array is mounted on the spectrometer surface and angled to direct the portion of the input light signal that is incident on the mirror at the spectrometer surface along the corresponding input waveguide.

10. The spectrometer of claim 9, wherein:
  a) the input aperture comprises a plurality of lenses including a lens corresponding to each of the mirrors in the mirror array, each lens being focused to direct the portion of the input light signal to the corresponding mirror.

11. The spectrometer of claim 1, wherein the array of interferometers and the plurality of input waveguides are provided on a single chip.

12. A method for determining a emitted light spectrum having a spectral bandwidth B and a spectral resolution $\Delta\lambda$, the method comprising:
  a) receiving an input light signal;
  b) directing the input light signal to an array of interferometers;
  c) concurrently detecting a first plurality of self-interfering signals from a first plurality of interferometers in the array of interferometers, the number of self-interfering signals in the first plurality of self-interfering signals being fewer than the number of samples required to satisfy the Nyquist criterion to reconstruct the emitted light spectrum; and
  d) reconstructing the emitted light spectrum from the plurality of self-interfering signals using compressive sensing.

13. The method of claim 12, wherein reconstructing the emitted light spectrum comprises:
  a) determining a discrete interference pattern from the first plurality of self-interfering signals;
  b) determining a plurality of potential emitted spectra;
  c) determining a distance value for each of the potential emitted spectra based on the discrete interference pattern and defined signal acquisition parameters of the spectrometer;
  d) identifying a lowest distance potential emitted spectrum as the potential emitted spectrum from the plurality of potential emitted spectra that corresponds to the lowest distance value; and
  e) reconstructing the emitted light spectrum as the lowest distance potential emitted spectrum.

14. The method of claim 13, further comprising:
  a) generating a pre-processed discrete interference pattern by removing low-resolution spectral signal components from the discrete interference pattern; and
  b) reconstructing the emitted light spectrum using the pre-processed discrete interference pattern.

15. The method of claim 14, further comprising:
  a) concurrently detecting a second plurality of self-interfering signals from a second plurality of interferometers in the array of interferometers;
  b) determining a low resolution spectrum of the input light signal with the spectral bandwidth B and a spectral resolution of $\Delta\lambda_{low}$ where $\Delta\lambda_{low} > 2\Delta\lambda$ from the second plurality of self-interfering signals using a Fourier transform, wherein the number of self-interfering signals in the second plurality of self-interfering signals is not less than the number of interferogram samples required to satisfy the Nyquist criterion for reconstructing the low resolution spectrum; and
  c) identifying the low-resolution spectral signal components from the low resolution spectrum.

* * * * *